(12) United States Patent
Moloney et al.

(10) Patent No.: US 10,360,040 B2
(45) Date of Patent: Jul. 23, 2019

(54) APPARATUS, SYSTEMS, AND METHODS FOR PROVIDING COMPUTATIONAL IMAGING PIPELINE

(71) Applicant: Linear Algebra Technologies Limited, Dublin (IE)

(72) Inventors: David Moloney, Dublin (IE); Richard Richmond, Belfast (GB); David Donohoe, Stittsville (CA); Brendan Barry, Dublin (IE)

(73) Assignee: Movidius, LTD., Schiphol-Rijk (NL)

( * ) Notice: Subject to any disclaimer, the term of this patent is extended or adjusted under 35 U.S.C. 154(b) by 0 days.

(21) Appl. No.: 15/900,327

(22) Filed: Feb. 20, 2018

(65) Prior Publication Data

US 2018/0349147 A1  Dec. 6, 2018

Related U.S. Application Data

(63) Continuation of application No. 14/082,396, filed on Nov. 18, 2013, now Pat. No. 9,934,043.

(30) Foreign Application Priority Data

Aug. 8, 2013  (GB) .................................. 1314263.3
Nov. 6, 2013  (RO) .................................... A/00812

(51) Int. Cl.
*G06F 12/00* (2006.01)
*G06F 9/38* (2018.01)
(Continued)

(52) U.S. Cl.
CPC .............. *G06F 9/3885* (2013.01); *G06T 1/20* (2013.01); *G06T 1/60* (2013.01); *G09G 5/363* (2013.01);
(Continued)

(58) Field of Classification Search
CPC ....... G06F 9/3885; G09G 5/363; G09G 5/397
See application file for complete search history.

(56) References Cited

U.S. PATENT DOCUMENTS 4,281,312 A    7/1981  Knudson
4,680,730 A    7/1987  Omoda et al.
(Continued)

FOREIGN PATENT DOCUMENTS

CA    1236584    5/1988
CA    2751097    8/2010
(Continued)

OTHER PUBLICATIONS

State Intellectual Property Office of People's Republic of China, "Notification of First Office Action", issued in connection with Chinese Application No. 201480045179.0 dated Jul. 20, 2018, 20 pages.
(Continued)

*Primary Examiner* — Gurtej Bansal
(74) *Attorney, Agent, or Firm* — Hanley Flight & Zimmerman, LLC

(57) ABSTRACT

The present application relates generally to a parallel processing device. The parallel processing device can include a plurality of processing elements, a memory subsystem, and an interconnect system. The memory subsystem can include a plurality of memory slices, at least one of which is associated with one of the plurality of processing elements and comprises a plurality of random access memory (RAM) tiles, each tile having individual read and write ports. The interconnect system is configured to couple the plurality of processing elements and the memory subsystem. The interconnect system includes a local interconnect and a global interconnect.

30 Claims, 27 Drawing Sheets

(51) Int. Cl.
  *G09G 5/36* (2006.01)
  *G09G 5/397* (2006.01)
  *G06T 1/20* (2006.01)
  *G06T 1/60* (2006.01)

(52) U.S. Cl.
  CPC ......... *G09G 5/397* (2013.01); *G09G 2360/08* (2013.01); *G09G 2360/122* (2013.01); *G09G 2360/126* (2013.01)

(56) References Cited

U.S. PATENT DOCUMENTS

| | | |
|---|---|---|
| 4,783,841 A | 11/1988 | Crayson |
| 5,081,573 A | 1/1992 | Hall et al. |
| 5,226,171 A | 7/1993 | Hall et al. |
| 5,262,973 A | 11/1993 | Richardson |
| 5,434,623 A | 7/1995 | Coleman et al. |
| 5,729,714 A | 3/1998 | Dei |
| 5,861,873 A | 1/1999 | Kikinis |
| 5,968,167 A | 10/1999 | Whittaker et al. |
| 6,104,836 A | 8/2000 | Buckley et al. |
| 6,173,389 B1 | 1/2001 | Pechanek et al. |
| 6,184,709 B1* | 2/2001 | New ................ H03K 19/1776 326/38 |
| 6,275,921 B1 | 8/2001 | Iwata et al. |
| 6,304,605 B1 | 10/2001 | Haikonen et al. |
| 6,329,162 B1 | 12/2001 | Han et al. |
| 6,366,999 B1 | 4/2002 | Drabenstott et al. |
| 6,467,036 B1 | 10/2002 | Pechanek et al. |
| 6,577,316 B2 | 6/2003 | Brethour et al. |
| 6,591,019 B1 | 7/2003 | Comair et al. |
| 6,757,019 B1 | 6/2004 | Hsieh et al. |
| 6,760,831 B2 | 7/2004 | Drabenstott et al. |
| 6,813,390 B2 | 11/2004 | Ali |
| 6,839,728 B2 | 1/2005 | Pitsianis et al. |
| 6,851,041 B2 | 2/2005 | Pechanek et al. |
| 6,859,870 B1 | 2/2005 | Kim et al. |
| 6,948,087 B2 | 9/2005 | Brethour et al. |
| 6,954,842 B2 | 10/2005 | Drabenstott et al. |
| 7,010,668 B2 | 3/2006 | Drabenstott et al. |
| 7,038,687 B2 | 5/2006 | Booth, Jr. et al. |
| 7,124,279 B2 | 10/2006 | Topham |
| 7,146,487 B2 | 12/2006 | Drabenstott et al. |
| 7,167,890 B2 | 1/2007 | Lin et al. |
| 7,196,708 B2 | 3/2007 | Dorojevets et al. |
| 7,343,471 B2 | 3/2008 | Topham |
| 7,366,874 B2 | 4/2008 | Seong et al. |
| 7,409,530 B2 | 8/2008 | Kim et al. |
| 7,424,594 B2 | 9/2008 | Pitsianis et al. |
| 8,010,781 B2 | 8/2011 | Mauro et al. |
| 8,200,594 B1 | 6/2012 | Bleiweiss |
| 8,615,039 B2 | 12/2013 | Lee et al. |
| 8,713,080 B2 | 4/2014 | Moloney |
| 8,948,270 B2 | 2/2015 | Raveendran |
| 9,146,747 B2 | 9/2015 | Moloney et al. |
| 9,934,043 B2 | 4/2018 | Moloney et al. |
| 2003/0005261 A1 | 1/2003 | Sheaffer |
| 2003/0149822 A1 | 8/2003 | Scott et al. |
| 2003/0154358 A1 | 8/2003 | Seong et al. |
| 2004/0101045 A1 | 5/2004 | Yu et al. |
| 2004/0133763 A1 | 7/2004 | Mathur et al. |
| 2004/0260410 A1 | 12/2004 | Sakamoto |
| 2006/0023429 A1 | 2/2006 | Ribiero et al. |
| 2006/0050591 A1 | 3/2006 | Park |
| 2007/0030274 A1 | 2/2007 | Woo |
| 2007/0291571 A1 | 12/2007 | Balasundaram |
| 2008/0007562 A1 | 1/2008 | Stuttard et al. |
| 2008/0068389 A1 | 3/2008 | Bakalash et al. |
| 2009/0049264 A1 | 2/2009 | Resnick |
| 2009/0094430 A1* | 4/2009 | Bergheaud .............. G06F 9/526 711/163 |
| 2009/0204837 A1 | 8/2009 | Raval et al. |
| 2009/0228683 A1 | 9/2009 | Studdard et al. |
| 2009/0319730 A1 | 12/2009 | Tanaka et al. |
| 2012/0096445 A1 | 4/2012 | Berg et al. |
| 2012/0110267 A1 | 5/2012 | Karkkainen et al. |
| 2012/0216019 A1 | 8/2012 | Bower et al. |
| 2012/0311360 A1 | 12/2012 | Balasubramanian et al. |
| 2013/0009980 A1 | 1/2013 | Gu |
| 2013/0116986 A1 | 5/2013 | Zhang et al. |
| 2014/0040909 A1 | 2/2014 | Winser et al. |
| 2014/0169669 A1 | 6/2014 | Yeh et al. |
| 2014/0176569 A1 | 6/2014 | Meixner |
| 2014/0298068 A1 | 10/2014 | Kosonocky et al. |
| 2015/0046674 A1 | 2/2015 | Barry et al. |
| 2015/0172539 A1 | 6/2015 | Neglur |

FOREIGN PATENT DOCUMENTS

| | | |
|---|---|---|
| CN | 1078841 | 11/1993 |
| CN | 1326132 | 12/2001 |
| CN | 101086680 | 12/2007 |
| DE | 69228442 | 9/1999 |
| DE | 69519801 | 6/2001 |
| DE | 69709078 | 10/2002 |
| DE | 102007025948 | 1/2008 |
| EP | 0240032 | 10/1987 |
| EP | 0245027 | 11/1987 |
| EP | 1071010 | 1/2001 |
| EP | 1158401 | 11/2001 |
| EP | 1241892 | 9/2002 |
| ES | 2171919 | 9/2002 |
| FI | 97096 | 6/1996 |
| FR | 2835934 | 8/2003 |
| GB | 0710876 | 6/1954 |
| GB | 1488538 | 10/1977 |
| GB | 2311882 | 10/1997 |
| GB | 2348971 | 10/2000 |
| GB | 2362055 | 11/2001 |
| GB | 2362733 | 11/2001 |
| GB | 2366643 | 3/2002 |
| JP | 07200398 | 8/1995 |
| JP | 3042969 | 5/2000 |
| JP | 2002007211 | 1/2002 |
| JP | 3956652 | 8/2007 |
| JP | 2012168871 | 9/2012 |
| WO | 9313628 | 7/1993 |
| WO | 9608928 | 3/1996 |
| WO | 9738372 | 10/1997 |
| WO | 9963751 | 12/1999 |
| WO | 0022503 | 4/2000 |
| WO | 0034887 | 6/2000 |
| WO | 0045282 | 8/2000 |
| WO | 0143074 | 6/2001 |
| WO | 200551099 | 6/2002 |
| WO | 2002080563 | 10/2002 |
| WO | 2003088033 | 10/2003 |
| WO | 2005091109 | 9/2005 |
| WO | 200810634 | 1/2008 |
| WO | 2008087195 | 7/2008 |
| WO | 2010086919 | 8/2010 |
| WO | 0184849 | 11/2011 |
| WO | 2015019197 | 2/2015 |
| WO | 2015040450 | 3/2015 |
| WO | 2015084966 | 6/2015 |

OTHER PUBLICATIONS

Buckler et al., "Reconfiguring the Imaging Pipeline for Computer Vision," 2017, 15 pages.
Dally et al., "Efficient Embedded Computing," IEEE Computer Society, 2008, pp. 27-32.
Kahle et al., "Introduction to the Cell Multiprocessor," IBM J. Res. & Dev., vol. 48, No. 4/5, 2005, pp. 589-604.
NVIDIA Corporation, "Chimera: The NVIDIA Computational Photography Architecture: Delivering Stunning Camera Capabilities to the Tegra 4 Family of SoCs," Whitepaper, 2013, 15 pages.
Young, "Code Scheduling Methods for Some Architectural Features in Pipe," Microprocessing and Microprogramming, vol. 22, No. 1, Jan. 1, 1988, pp. 39-63.
International Searching Authority, "International Search Report and Written Opinion," issued in connection with International Patent

(56) References Cited

OTHER PUBLICATIONS

Application No. PCT/IB2015/001805, dated May 11, 2016, 16 pages.
Alexander, "Evolution and Use of the VME Subsystem Bus—VSB," VSB History of VME Subsystem Buses, vol. 10, No. 6, 1986, pp. 307-312.
International Searching Authority, "International Search Report and Written Opinion," issued in connection with International Patent Application No. PCT/IB2014/002541, dated Jul. 20, 2015, 14 pages.
"ARM Architecture Reference Manual," ARMv7 and ARMv7-R edition, 2012, 2734 pages.
"Cortex-A8," Revision r3p2, Technical Reference Manual, 2010, 580 pages.
"Cortex-A9 NEON Media Processing Engine," Revision r3p0, Technical Reference Manual, 2011, 49 pages.
"iMX 6Dual/6Quad Applications Processor Reference Manual," Rev. 2, Jun. 2014, 5817 pages.
"MSC8256 Reference Manual," Six Core Digital Signal Processor, Rev. 0, Jul. 2011, 1272 pages.
"SC140 DSP Core Reference Manual," Rev. 3, Nov. 2001, 712 pages.
Rosten et al., "Machine Learning for High-speed Corner Detection," Department of Engineering, Cambridge University, 2006, 14 pages.
Williamson, "ARM Cortex A8: A High Performance Processor for Low Power Applications," 2008, 23 pages.
Japanese Patent Office, "Notice of Reasons for Rejection," issued in connection with Japanese Patent Application No. 2016-532759, dated Jul. 17, 2018, 10 pages.
United States Patent and Trademark Office, "Non-final Office Action," issued in connection with U.S. Appl. No. 14/082,396, dated Mar. 29, 2016, 10 pages.
United States Patent and Trademark Office, "Final Office Action," issued in connection with U.S. Appl. No. 14/082,396, dated Aug. 18, 2016, 13 pages.
United States Patent and Trademark Office, "Non-final Office Action," issued in connection with U.S. Appl. No. 14/082,396, dated Jun. 15, 2017, 16 pages.
United States Patent and Trademark Office, "Notice of Allowance," issued in connection with U.S. Appl. No. 14/082,396, dated Nov. 16, 2017, 5 pages.
Japanese Patent Office, "Notice of Reasons for Rejection," issued in connection with Japanese Patent Application No. 2016532759, dated Mar. 26, 2019, 4 pages.
United States Patent and Trademark Office, "Notice of Allowance," issued in connection with U.S. Appl. No. 14/082,645, dated May 22, 2015, 1 page.
Chinese Patent Office, "Second Office Action," issued in connection with Chinese Patent Application No. 201480045179.0, dated May 31, 2019, 4 pages.

\* cited by examiner

APPARATUS, SYSTEMS, AND METHODS FOR PROVIDING COMPUTATIONAL IMAGING PIPELINE

CROSS-REFERENCE TO RELATED APPLICATION

This application claims the benefit of U.S. patent application Ser. No. 14/082,396, entitled "APPARATUS, SYSTEMS, AND METHODS FOR PROVIDING COMPUTATIONAL IMAGING PIPELINE," filed on Nov. 18, 2013, which claims the benefit of the earlier priority date of U.K. Patent Application No. GB1314263.3, entitled "CONFIGURABLE AND COMPOSABLE COMPUTATIONAL IMAGING PIPELINE," filed on Aug. 8, 2013, by Linear Algebra Technologies Limited, and of the Romanian Patent Application, Identified as OSIM Registratura A/00812, entitled "APPARATUS, SYSTEMS AND METHODS FOR PROVIDING CONFIGURABLE AND COMPOSABLE COMPUTATIONAL IMAGING PIPELINE," filed on Nov. 6, 2013, by Linear Algebra Technologies Limited, both of which are expressly incorporated herein by reference in their entirety.

FIELD OF THE APPLICATION

This present application relates generally to processing devices suitable for image and video processing.

BACKGROUND

Computational image and video processing is very demanding in terms of memory bandwidth as image resolutions and frame rates are high, with aggregate pixel rates in the high hundreds of megapixels per second being common place. Furthermore, as this field is in its relative infancy, algorithms are in constant flux. Therefore, it is difficult to implement them entirely in hardware as changes to the algorithms can mean hardware is unable to adapt. At the same time, a software approach relying on implementation in processors alone is unrealistic. Accordingly, it is generally desirable to provide a flexible architecture/infrastructure, which can accommodate processors and hardware accelerators.

At the same time, the demand for such video and image processing is coming to a large extent from portable electronic devices, for example tablet computers and mobile devices, where power consumption is a key consideration. As a result, there is a general need for a flexible infrastructure to couple programmable multicore processors and hardware accelerators with a high bandwidth memory subsystem that allows them to deliver a sustained data transfer rate at low power levels necessary for portable electronic devices.

SUMMARY

In accordance with the disclosed subject matter, apparatus, systems, and methods are provided for providing configurable and composable computational imaging pipeline.

Disclosed subject matter includes a parallel processing device. The processing device includes a plurality of processing elements each configured to execute instructions and a memory subsystem comprising a plurality of memory slices including a first memory slice associated with one of the plurality of processing elements. The first memory slice comprises a plurality of random access memory (RAM) tiles each having individual read and write ports. The parallel processing device can include an interconnect system configured to couple the plurality of processing elements and the memory subsystem. The interconnect system can include a local interconnect configured to couple the first memory slice and the one of the plurality of processing elements, and a global interconnect configured to couple the first memory slice and the remaining of the plurality of processing elements.

In some embodiments, the one of the plurality of RAM tiles is associated with an arbitration block, wherein the arbitration block is configured to receive memory access requests from one of the plurality of processing elements and to grant, to the one of the plurality of processing elements, an access to the one of the plurality of RAM tiles.

In some embodiments, the arbitration block is configured to grant access to the one of the plurality of RAM tiles in a round-robin manner.

In some embodiments, the arbitration block comprises a clash detector configured to monitor memory access requests to the one of the plurality of RAM tiles and to determine whether two or more of the plurality of processing elements are attempting to access the one of the plurality of RAM tiles simultaneously.

In some embodiments, the clash detector is coupled to a plurality of address decoders, wherein each of the plurality of address decoders is coupled to one of the plurality of processing elements and is configured to determine whether the one of the plurality of processing elements is attempting to access the one of the plurality of RAM tiles associated with the arbitration block.

In some embodiments, the plurality of processing elements comprises at least one vector processor and at least one hardware accelerator.

In some embodiments, the parallel processing device includes a plurality of memory slice controllers each configured to provide access to one of the plurality of memory slices.

In some embodiments, the interconnect system comprises a first bus configured to provide communication between the at least one vector processor and the memory subsystem.

In some embodiments, the interconnect system comprises a second bus system configured to provide communication between the at least one hardware accelerator and the memory subsystem.

In some embodiments, the second bus system comprises a slice address request filter configured to mediate communication between the at least one hardware accelerator and the memory subsystem by receiving a memory access request from the at least one hardware accelerator and by granting, to the at least one hardware accelerator, access to the memory subsystem.

In some embodiments, one of the plurality of processing devices comprises a buffer to increase a throughput of the memory subsystem, wherein a number of elements in the buffer is greater than a number of cycles for retrieving data from the memory subsystem.

Disclosed subject matter includes a method for operating a parallel processing system. The method includes providing a plurality of processing elements including a first processing element and a second processing element, wherein each of the plurality of processing elements is configured to execute instructions. The method also includes providing a memory subsystem comprising a plurality of memory slices including a first memory slice associated with the first processing element, wherein the first memory slice comprises a plurality of random access memory (RAM) tiles each having individual read and write ports. The method further includes receiving, by an arbitration block associated with one of the plurality of RAM tiles via a local interconnect of an interconnect system, a first memory access request from the first processing element. The method additionally includes sending, by the arbitration block via the global interconnect, a first authorization message to the first processing element to authorize the first processing element to access the one of the plurality of RAM tiles.

In some embodiments, the method further includes receiving, by the arbitration block via a global interconnect of the interconnect system, a second memory access request from a second processing element; and sending, by the arbitration block via the global interconnect, a second authorization message to the second processing element to authorize the second processing element to access the one of the plurality of RAM tiles.

In some embodiments, the method further includes sending, by the arbitration block, a plurality of authorization messages to the plurality of processing elements to authorize access to the one of the plurality of RAM tiles in a round-robin manner.

In some embodiments, the method further includes monitoring, by a clash detector in the arbitration block, memory access requests to the one of the plurality of RAM tiles; and determining whether two or more of the plurality of processing elements are attempting to access the one of the plurality of RAM tiles simultaneously.

In some embodiments, the plurality of processing elements comprises at least one vector processor and at least one hardware accelerator.

In some embodiments, the method further includes providing a plurality of memory slice controllers each configured to provide access to one of the plurality of memory slices.

In some embodiments, the method further includes providing communication between the at least one vector processor and the memory subsystem via a first bus system of the interconnect system.

In some embodiments, the method further includes providing communication between the at least one hardware accelerator and the memory subsystem via a second bus system of the interconnect system.

In some embodiments, the second bus system comprises a slice address request filter configured to mediate communication between the at least one hardware accelerator and the memory subsystem by receiving a memory access request from the at least one hardware accelerator and by granting, to the at least one hardware accelerator, access to the memory subsystem.

Disclosed subject matter includes an electronic device. The electronic device includes a parallel processing device. The processing device includes a plurality of processing elements each configured to execute instructions and a memory subsystem comprising a plurality of memory slices including a first memory slice associated with one of the plurality of processing elements. The first memory slice comprises a plurality of random access memory (RAM) tiles each having individual read and write ports. The parallel processing device can include an interconnect system configured to couple the plurality of processing elements and the memory subsystem. The interconnect system can include a local interconnect configured to couple the first memory slice and the one of the plurality of processing elements, and a global interconnect configured to couple the first memory slice and the remaining of the plurality of processing elements. The electronic device also includes a processor, in communication with the parallel processing device, configured to run a module stored in memory. The module is configured to receive a flow graph associated with a data processing process, wherein the flow graph comprises a plurality of nodes and a plurality of edges connecting two or more of the plurality of nodes, wherein each node identifies an operation and each edge identifies a relationship between the connected nodes; and assign a first node of the plurality of nodes to a first processing element of the parallel processing device and a second node of the plurality of nodes to a second processing element of the parallel processing device, thereby parallelizing operations associated with the first node and the second node.

In some embodiments, the flow graph is provided in an extensible markup language (XML) format.

In some embodiments, the module is configured to assign the first node of the plurality of nodes to the first processing element based on a past performance of a memory subsystem in the parallel processing device.

In some embodiments, the memory subsystem of the parallel processing device comprises a counter that is configured to count a number of memory clashes over a predetermined period of time, and the past performance of the memory subsystem comprises the number of memory clashes measured by the counter.

In some embodiments, the module is configured to assign the first node of the plurality of nodes to the first processing element while the parallel processing device is operating at least a portion of the flow graph.

In some embodiments, the module is configured to receive a plurality of flow graphs, and assign all operations associated with the plurality of flow graphs to a single processing element in the parallel processing device.

In some embodiments, the module is configured to stagger memory accesses by the processing elements to reduce memory clashes.

In some embodiments, the electronic device comprises a mobile device.

In some embodiments, the flow graph is specified using an application programming interface (API) associated with the parallel processing device.

In some embodiments, the module is configured to provide input image data to the plurality of processing elements by dividing the input image data into strips and providing one strip of the input image data to one of the plurality of processing elements In some embodiments, a number of the strips of the input image data is the same as a number of the plurality of processing elements.

Disclosed subject matter includes a method. The method includes receiving, at a processor in communication with a parallel processing device, a flow graph associated with a data processing process, wherein the flow graph comprises a plurality of nodes and a plurality of edges connecting two or more of the plurality of nodes, wherein each node identifies an operation and each edge identifies a relationship between the connected nodes. The method also includes assigning a first node of the plurality of nodes to a first processing element of the parallel processing device and a second node of the plurality of nodes to a second processing element of the parallel processing device, thereby parallelizing operations associated with the first node and the second node. The parallel processing device also includes a memory subsystem comprising a plurality of memory slices including a first memory slice associated with the first processing element, wherein the first memory slice comprises a plurality of random access memory (RAM) tiles each having individual read and write ports; and an interconnect system configured to couple the first processing element, the second processing element, and the memory subsystem. The interconnect system includes a local interconnect configured to couple the first memory slice and the first processing element, and a global interconnect configured to couple the first memory slice and the second processing element.

In some embodiments, assigning the first node of the plurality of nodes to the first processing element of the parallel processing device comprises assigning the first node of the plurality of nodes to the first processing element based on a past performance of a first memory slice in the parallel processing device.

In some embodiments, the method also includes counting, at a counter in the memory subsystem, a number of memory clashes in the first memory slice over a predetermined period of time, and the past performance of the first memory slice comprises the number of memory clashes in the first memory slice.

In some embodiments, assigning the first node of the plurality of nodes to the first processing element is performed while the parallel processing device is operating at least a portion of the flow graph.

In some embodiments, the method also includes staggering memory accesses by the processing elements to the first memory slice in order to reduce memory clashes.

In some embodiments, the flow graph is specified using an application programming interface (API) associated with the parallel processing device.

In some embodiments, the method also includes providing an input image data to the plurality of processing elements by dividing the input image data into a plurality of strips and providing one of the plurality of strips of the input image data to one of the plurality of processing elements.

In some embodiments, a number of the plurality of strips of the input image data is the same as a number of the plurality of processing elements.

DESCRIPTION OF DRAWINGS

The present application will now be described with reference to the drawings.

DETAILED DESCRIPTION

Figure 1:
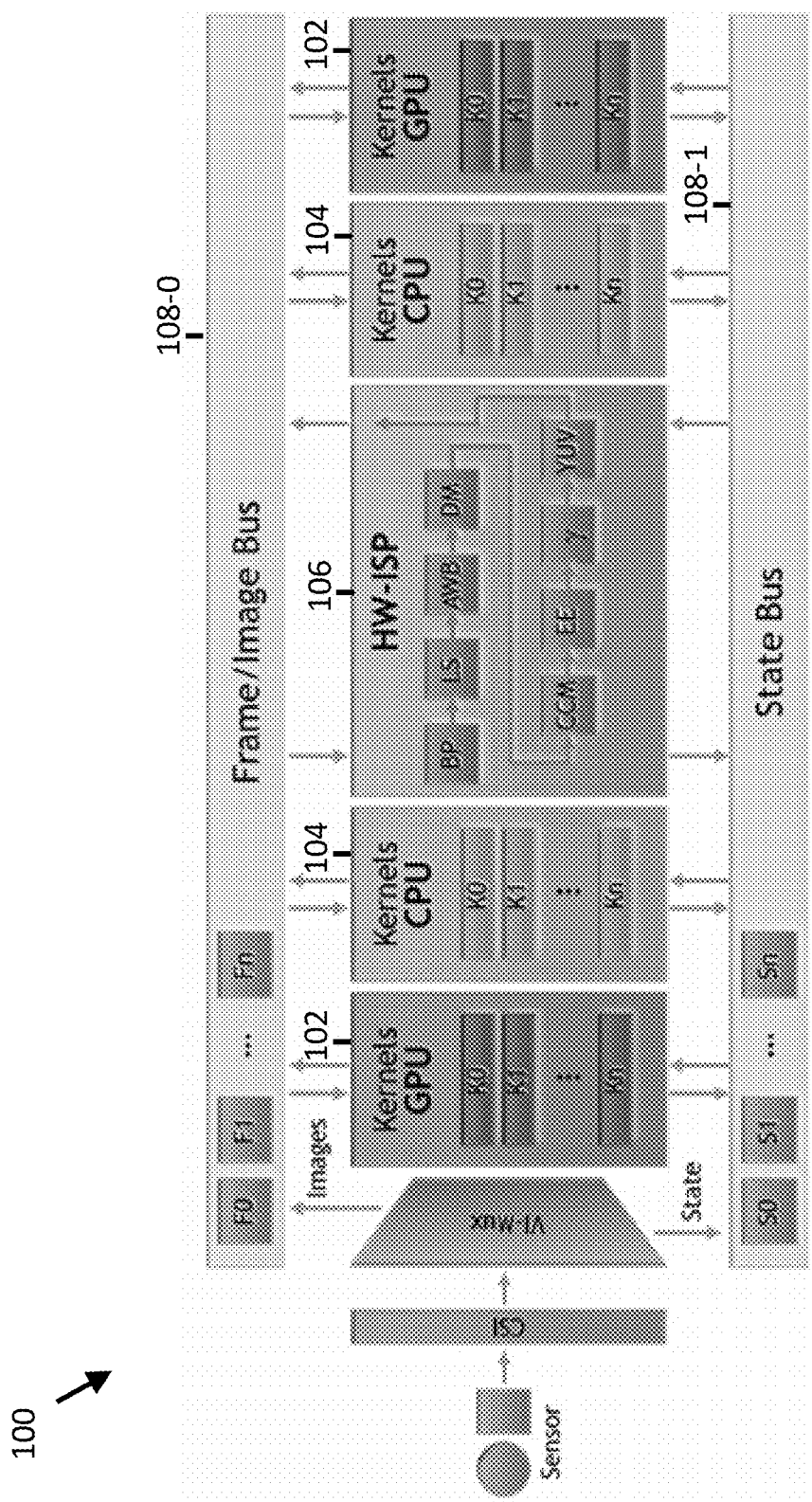
FIG. 1 describes a computational imaging platform of Chimera.

One possible way of interconnecting such different processing resources (e.g., processors and hardware accelerators) is to use a bus as outlined in the computational photography engine of Chimera, developed by NVidia. FIG. 1 illustrates the computational photography engine of Chimera. The Chimera computational photography engine 100 includes multiple Graphics Processing Unit (GPU) cores 102 that are connected to a Multicore ARM processor sub-system 104 and hardware (HW) Image Signal Processing (ISP) accelerators 106 via a flat-level bus infrastructure 108 (e.g., a single hierarchy bus system that connects all processing elements). The Chimera computational photography engine is presented generally as a software framework that abstracts the details of the underlying GPU cores 102, CPUs 104, and ISP blocks 106 from the programmer. Furthermore, the Chimera computational photography engine 100 describes dataflow through their computational photography engine via two information busses 108-0, 108-1, the first bus 108-0 carrying image or frame data and the second bus 108-1 carrying state information associated with each frame.

The use of a flat-level bus infrastructure, as in Chimera, can be cheap and convenient to implement. However, the use of a flat-level bus infrastructure can have a number of notable disadvantages as a means of interconnecting heterogeneous processing elements (e.g., processing elements of various types), such as GPU cores 102, CPUs 104, and ISP blocks 106. First, the use of a bus to interconnect computational resources means that memory can be distributed throughout the system local to each central processing unit (CPU) 104, a graphics processing unit (GPU) 102, and/or an image signal processor (ISP) block 106. Therefore, memory cannot be allocated flexibly within the processing pipeline in accordance with the requirements of the computational photography pipeline the programmer wishes to implement. This lack of flexibility may mean that certain image or video processing are either difficult or impossible to implement or that an implementation is limited in terms of frame-rate, image quality or otherwise.

Second, the use of a flat-level bus infrastructure also means that different computational resources (CPUs 104, GPUs 102, and ISP blocks 106) have to contend for bus bandwidth. This contention requires arbitration, which reduces the amount of available bus bandwidth. Therefore, progressively less of the theoretical bandwidth is available for actual work. The reduction of bandwidth may mean that a processing pipeline fails to meet the performance requirements of the application in terms of a frame rate, image quality and/or power.

Third, insufficient memory in proximity to a particular computational resource may mean that data has to be transferred back and forth between memory associated with a given GPU 102, CPU 104, or hardware ISP block 106 and another computational resource. This lack of locality means that additional bus bandwidth and arbitration overhead can be incurred. Furthermore, the lack of locality also means that additional power is consumed. Therefore, it may be difficult or impossible to support a particular algorithm at a particular target frame-rate.

Fourth, the use of a flat-level bus infrastructure may also compound difficulties in constructing a pipeline from heterogeneous processing elements, each of which may have different latency characteristics. For instance, GPU cores 102 are designed to tolerate latency by running multiple overlapping process threads to handle multiple outstanding accesses to memory (usually external DRAM) to cover latency, whereas normal CPUs 104 and hardware ISP blocks 106 are not designed to be latency tolerant.

Figure 2:
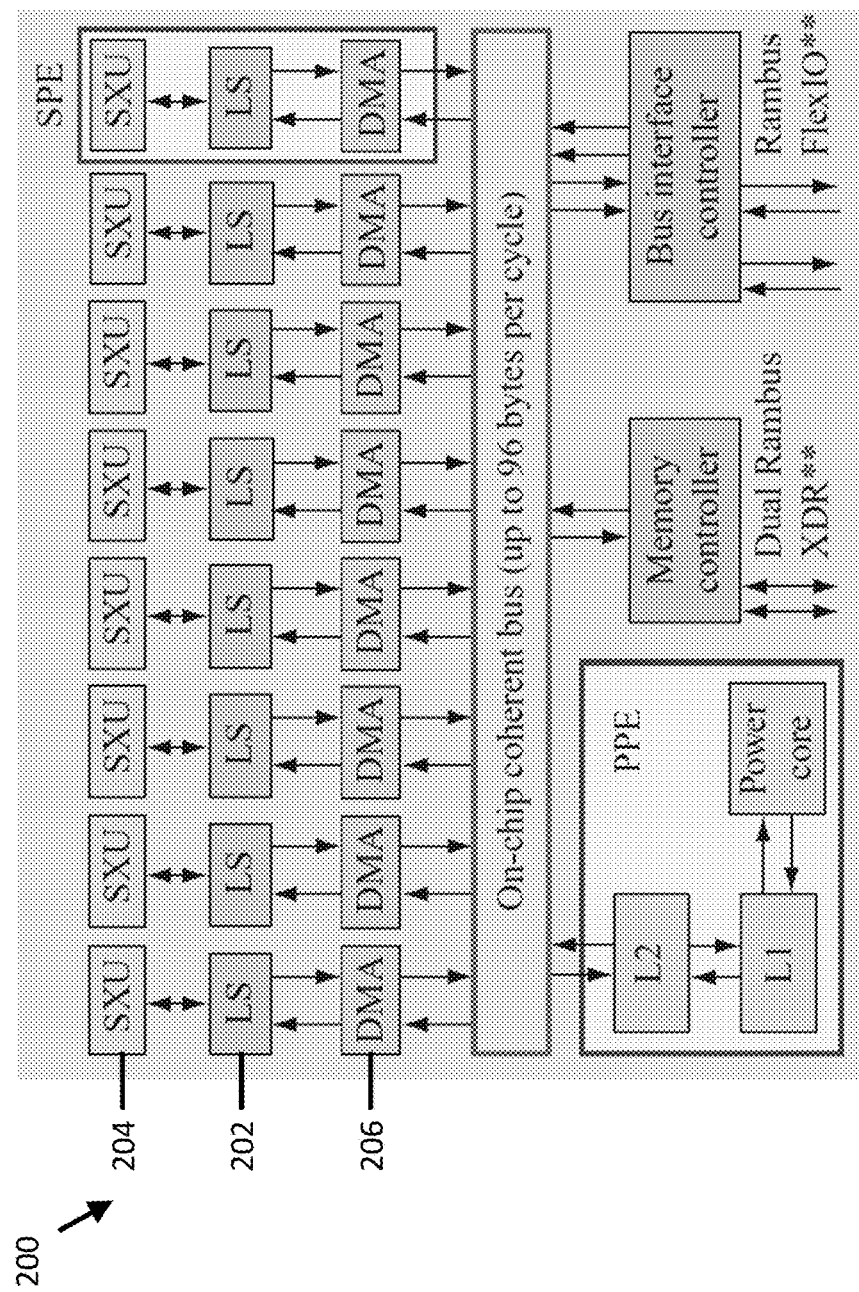
FIG. 2 describes a multicore architecture of a Cell processor.

Another way to interconnect different processing resources is provided by a Cell processor architecture developed by IBM, which is illustrated in FIG. 2. The Cell processor architecture 200 includes a local storage (LS) 202 available to each processor 204, also known as a synergistic execution unit (SXU). The Cell processor 200 relies on a time-shared infrastructure and direct memory access (DMA) 206 transfers to programmatically schedule data-transfers between one processor's LS 202 and another processor's LS 202. The difficulty with the Cell architecture 200 is the complexity faced by the programmer to explicitly schedule background data-transfers many hundreds of cycles in advance (due to the high latencies in the Cell architecture 200) so as to ensure that shared data is available to each processor 204 when required. If the programmer does not explicitly schedule background data transfers, processors 204 would stall, which would degrade the performance.

Figure 3:
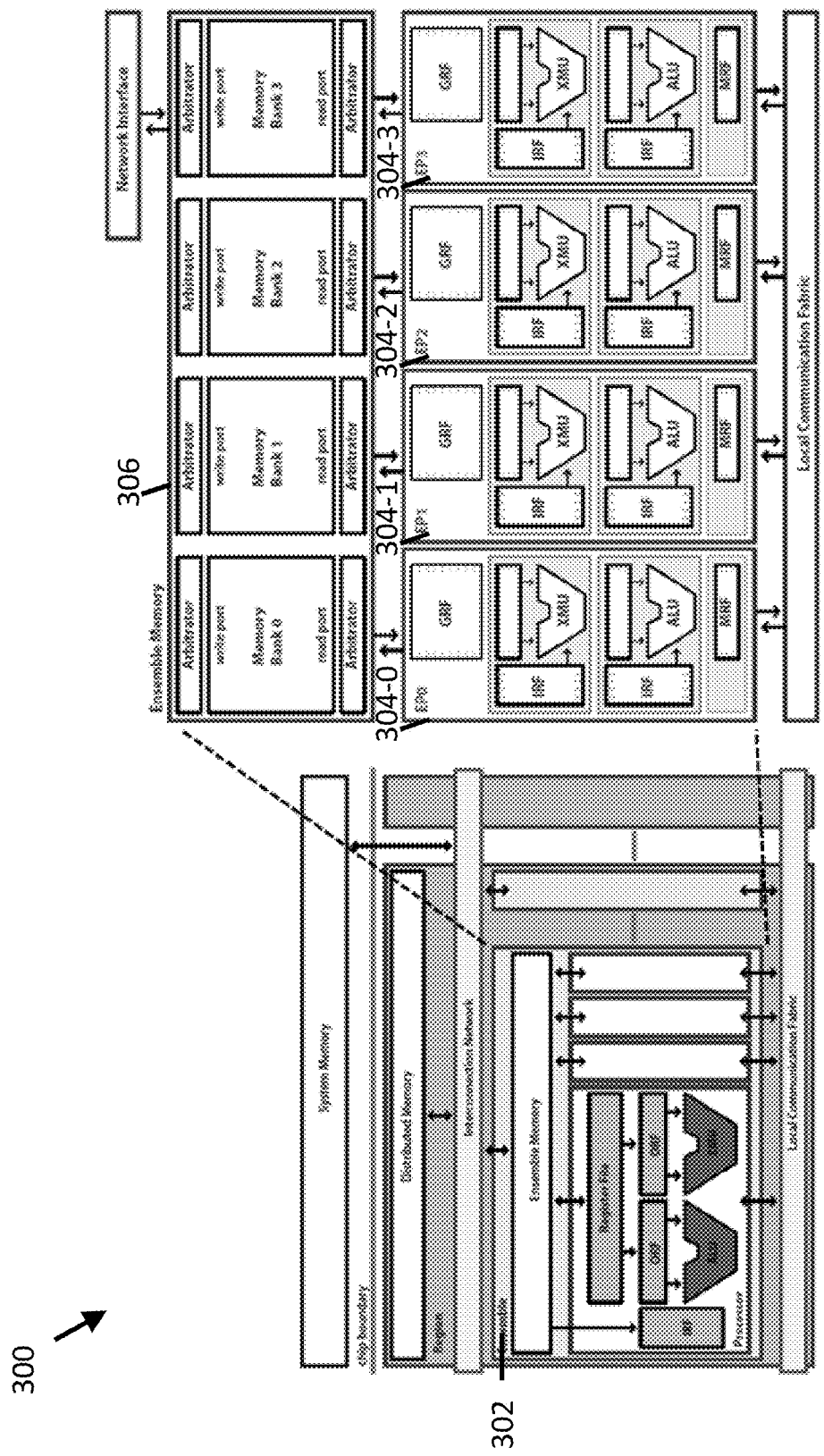
FIG. 3 describes an efficient low-power microprocessor (ELM) architecture.

Another way to interconnect different processing resources is to use a shared multicore memory subsystem to share data efficiently between processors in a multicore processing system. This shared multicore memory subsystem is used in the Efficient Low-power Microprocessor (ELM) system. FIG. 3 illustrates the ELM system. The ELM system 300 includes an ensemble 302, the primary physical design unit for compute resources in an ELM system. The ensemble 302 includes a cluster of four processors 304 that are loosely coupled. The cluster of four processors 304 share local resources such as an ensemble memory 306 and an interface to the interconnection network. The ensemble memory 306 captures instruction and data working sets close to the processors 304, and is banked to allow the local processors 304 and network interface controller to access it concurrently. Each processor 304 within an ensemble 302 is assigned a preferred bank in the ensemble memory 306. Accesses by a processor 304 to its preferred bank are prioritized ahead of accesses (and will block accesses) by other processors and the network interface. Instructions and data that are private to a single processor 304 may be stored in its preferred bank to provide deterministic access times. The arbiters that control access to the read and write ports are biased to establish an affinity between processors 304 and memory banks 306. This allows software to make stronger assumptions about bandwidth availability and latency when accessing data that may be shared by multiple processors.

However, the ELM architecture 300 can consume a lot of power due to the physically large random access memory (RAM) blocks. Furthermore, the ELM architecture 300 can suffer from low throughput where there is a lot of data-sharing between processors 304. In addition, no provision is made for data-sharing between processors 304 and hardware accelerators, which can be advantageous in terms of power and performance in certain cases.

The present disclosure relates to apparatus, systems, and methods for enabling multiple processors and hardware accelerators to access shared data simultaneously with other processors and hardware accelerators. The present disclosure provides apparatus, systems, and methods for accessing shared data simultaneously, without being blocked by a local processor that has a higher affinity (e.g., a higher priority) to access local storage.

The disclosed apparatus, systems, and methods provide substantial benefits over existing multicore memory architectures. Existing multicore memory architectures use a single monolithic block of RAM per processor, which can limit the bandwidth at which data can be accessed. The disclosed architecture can provide a mechanism for accessing memory at a substantially higher bandwidth compared to existing multicore memory architectures that use a single monolithic block of RAM. The disclosed architecture obtains this higher bandwidth by instantiating multiple physical RAM blocks per processor, instead of instantiating a single large RAM block per processor. Each RAM block can include a dedicated access arbitration block and a surrounding infrastructure. Therefore, each RAM block in the memory subsystem can be accessed independently of others by multiple processing elements in the system, for example, vector processors, reduced instruction set computing (RISC) processors, hardware accelerators, or DMA engines.

This is somewhat counter intuitive that the use of multiple small RAM instances is beneficial compared to using a single large RAM instance because a memory bank based on a single large RAM instance is more area efficient than a memory bank based on multiple, smaller RAM instances. However, the power dissipation for smaller RAM instances is typically significantly lower than for a single large RAM instance. Furthermore, if a single large physical RAM instance were to achieve the same bandwidth as multi-instance RAM blocks, the single large physical RAM instance would incur at a substantially higher power than one composed of multiple physical RAM instances. Therefore, at least from the power dissipation perspective, the memory subsystem can benefit from using multiple physical RAM instances than using a single large RAM instance.

The memory subsystem with multiple physical RAM instances can have an added advantage in that the cost per RAM access, for example, the memory access time or the power consumption, of smaller RAM blocks is typically a lot lower than that of larger RAM blocks. This is due to the shortened bit-lines used to read/write data from the RAMs. Furthermore, the access-time for reads and writes for smaller RAM blocks is also lower (due to the reduced resistance-capacitance (RC) time-constants associated with shorter bit-lines). Therefore, the processing elements coupled to the multi-RAM based memory subsystem can operate at a higher frequency, which in turn reduces static power due to static leakage current. This can be useful particularly when the processors and memory are isolated into power domains. For example, when a given processor or filter accelerator has completed its task, the power domain associated with the given processor or filter accelerator can be advantageously gated off. Therefore, the memory subsystem in the disclosed architecture has superior characteristics in terms of available bandwidth and power dissipation.

In addition, a memory subsystem with multiple RAM instances, each with arbitrated accesses, can provide many ways for data to be shared between processors and hardware accelerators, without dedicating a RAM block to a particular processor by locking the RAM block. In principle, if a larger RAM is subdivided into N sub-blocks, then the available data bandwidth is increased by approximately a factor of N. This is based on the assumption that data can be opportunely partitioned to reduce contemporaneous sharing (e.g., an access clash) by multiple processing elements. For example, when a consumer processor or a consumer accelerator reads data from a data buffer that is being filled by a producer processor or a producer accelerator, then there is a contemporaneous sharing of a data buffer, resulting in an access clash.

In some embodiments, the disclosed architecture can provide mechanisms for reducing a contemporaneous sharing of data. In particular, the disclosed architecture can be amenable for reducing the contemporaneous sharing via a static memory allocation mechanism and/or a dynamic memory allocation mechanism. For example, in the static memory allocation mechanism, data is mapped to different portions of memory before a program is started, e.g., during the program compilation stage, in order to reduce the contemporaneous sharing of the data. On the other hand, in the dynamic memory allocation scheme, data is mapped to different portions of memory during the program execution. Static memory allocation mechanism provides a predictable mechanism for allocating memory to data, and it does not incur any substantial overhead in terms of power or performance.

As another example, the disclosed architecture can be used in conjunction with a runtime scheduler running on a controller (e.g., a supervising RISC processor) or one or more processors that mediate access to data-structures partitioned across multiple RAM blocks. The runtime scheduler can be configured to stagger the start-times of different processing elements operating on parts (e.g., lines or tiles) of data (e.g., an image frame) in order to reduce simultaneous access to shared data.

In some embodiments, the runtime scheduler can be complemented with a hardware arbitration block. For example, the hardware arbitration block can be configured to mediate shared memory accesses by processors (such as vector processors) via a shared deterministic interconnect designed to reduce stalling. In some cases, the hardware arbitration block can be configured to perform a cycle-oriented scheduling. The cycle-oriented scheduling can include scheduling a use of a resource at a clock-cycle granularity, as opposed to scheduling a use of a resource at a task-level granularity, which may require multiple clock-cycles. Scheduling resource allocations at a clock cycle granularity can provide higher performance.

In other embodiments, the runtime scheduler can be complemented with a multiplicity of hardware accelerators each of which can include an input buffer and an output buffer to store data. The input and output buffers can be configured to absorb (or hide) the variance of delays in accessing external resources, such as external memory. The input and output buffers can include a first-in-first-out (FIFO) buffer, and the FIFO buffer can include a sufficient number of slots to store sufficient amount of data and/or instructions to absorb the variance of delays in accessing external resources.

In some embodiments, the disclosed apparatus, systems, and methods provide a parallel processing device. The parallel processing device can include a plurality of processors, such as a parallel processor, each of which may execute instructions. The parallel processing device can also include a plurality of memory slices, each memory slice being h associated with one of the parallel processing devices and giving preferential access to that processor over other processing devices in the parallel processing device. Each memory slice can include a plurality of RAM tiles, where each RAM tile can include a read port and a write port. In some cases, each memory slice may be provided with a memory slice controller for providing access to a related memory slice. The processors and the RAM tiles can be coupled to one another via a bus. In some cases, the bus can couple any of the processors with any of the memory slices. Suitably, each RAM tile can include a tile control logic block for granting access to the tile. The tile control logic block is sometimes referred to as a tile control logic or an arbitration block.

In some embodiments, the parallel processing device can further include at least one hardware accelerator configured to perform a predefined processing function, for example, image processing. In some cases, the predefined processing function can include a filtering operation.

In some embodiments, at least one hardware accelerator can be coupled to the memory slices via a separate bus. The separate bus can include an associated accelerator memory controller (AMC), which is configured to receive requests from at least one hardware accelerator and to grant, to the hardware accelerator, an access to a memory slice through the related memory slice controller. It will thus be appreciated that the memory access path employed by the hardware accelerators can be different to the path employed by the vector-processors. In some embodiments, the at least one hardware accelerator can include an internal buffer (e.g., a FIFO memory) to account for delays in accessing the memory slices.

In some embodiments, the parallel processing device can include a host processor. The host processor can be configured to communicate with an AMC via a host bus. The parallel processing device can also be provided with an application-programming interface (API). The API provides a high level interface to the vector processors and/or hardware accelerators.

In some embodiments, the parallel processing device can operate in conjunction with a compiler that provides instructions for the parallel processing device. In some cases, the compiler is configured to run on a host processor, which is distinct from the processing elements, such as a vector processor or a hardware accelerator. In some cases, the compiler is configured to receive a flow graph, via the image/video API 1206 (FIG. 12), specifying an image processing process. The compiler can be further configured to map one or more aspects of the flow graph to one or more of the processing elements, such as a vector processor or a hardware accelerator. In some embodiments, a flow graph can include nodes and edges, where each node identifies an operation, and each edge identifies relationships between nodes (e.g., operations), such as an order in which the operations are carried out. The compiler can be configured to assign a node (e.g., an operation) to one of the processing elements to parallelize the computation of the flow graph. In some embodiments, the flow graph may be provided in an extensible mark-up language (XML) format. In some embodiments, the compiler can be configured to allocate multiple flow graphs to a single processing element.

In some embodiments, the parallel processing device can be configured to measure its performance and provide the information to the compiler. Therefore, the compiler can use the past performance information received from the parallel processing device to determine the allocation of current tasks to processing elements in the parallel processing device. In some embodiments, the performance information can be indicative of a number of access clashes experienced by one or more processing elements in the processing device.

In some cases, the parallel processing device can be used in video applications, which may be computationally expensive. To address the computational demand of video applications, the parallel processing device can configure its memory subsystem to reduce the access clashes between processing units during memory access. To this end, as discussed previously, the parallel processing device can subdivide monolithic memory banks into multiple physical RAM instances, instead of using the monolithic memory banks as a single physical block of memory. With this subdivision, each physical RAM instance can be arbitrated for read and write operations, thereby increasing the available bandwidth by the number of physical RAM instances in the memory bank.

In some embodiments, the hardware cycle-oriented arbitration can also provide multiple traffic classes and programmable scheduling masks. The multiple traffic classes and programmable scheduling masks can be controlled using the runtime scheduler. The hardware cycle-oriented arbitration block can include a port arbitration block, which can be configured to allocate multiple requesters of a single shared resource in a round-robin scheduling scheme. In the round-robin scheduling scheme, requesters (e.g., processing elements) are granted access to a resource (e.g., memory) in the order the request was received from the requesters. In some cases, the port arbitration block can augment the round-robin scheduling scheme to account for the multiple traffic classes. The single shared resource can include a RAM-tile, shared registers, or other resources that vector-processors, filter accelerators, and RISC processors can access to share data. Additionally, the arbitration block can allow for over-riding the round-robin allocation of resources with a priority vector or super-priority vector. The priority vector or the super priority vector can be provided by a runtime scheduler in order to prioritize certain traffic classes (e.g., video traffic classes) as needed by a particular application of interest.

In some embodiments, a processing element can include one or more of a processor, such as a vector processor or a streaming hybrid architecture vector engine processor, a hardware accelerator, and a hardware filter operator.

Figure 4:
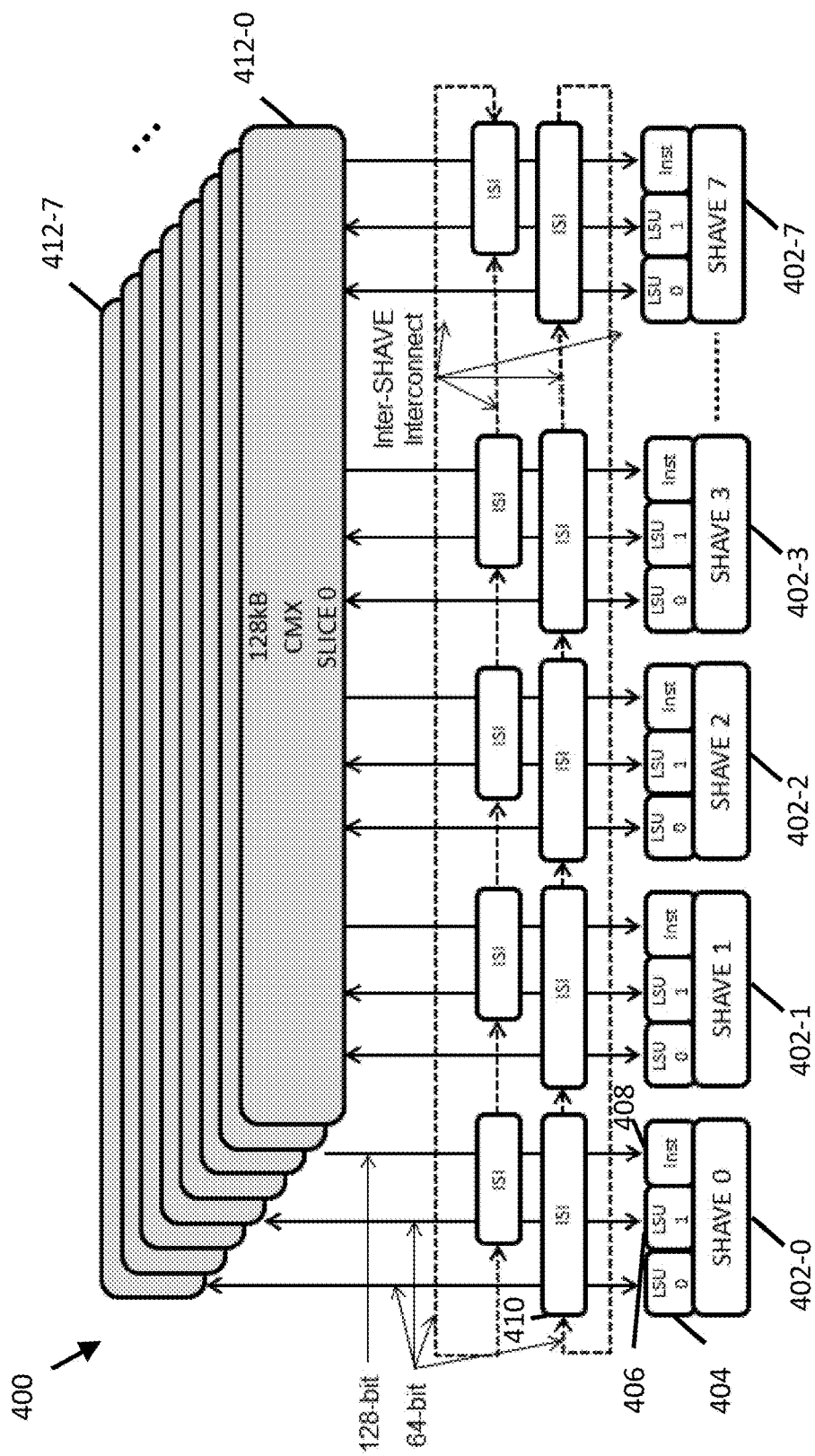
FIG. 4 illustrates an improved memory subsystem in accordance with some embodiments.

FIG. 4 illustrates a parallel processing device having a memory subsystem, which allows multiple processors (e.g., Streaming Hybrid Architecture Vector Engine (SHAVE) processors) to share a multiport memory subsystem in accordance with some embodiments. Specifically, FIG. 4 shows a parallel processing device 400, which is suitable for processing image and video data. The processing device 400 comprises a plurality of processing elements 402, such as a processor. In the exemplary configuration of FIG. 4, the processing device 400 includes 8 processors (SHAVE 0 402-0-SHAVE 7 402-7). Each processor 402 can include two load store units 404, 406 (LSU0, LSU1) by which data may be loaded from and stored to memory 412. Each processor 402 can also include an instruction unit 408 into which instructions may be loaded. A particular embodiment in which the processor includes a SHAVE, the SHAVE can include one or more of a reduced instruction set computer (RISC), a digital signal processor (DSP), a very long instruction word (VLIW), and/or a graphics processing unit (GPU). The memory 412 comprises a plurality of memory slices 412-0 . . . 412-7 referred to herein as connection matrix (CMX) slices. Each memory slice 412-N is associated with a corresponding processor 402-7.

The parallel processing device 400 also includes an interconnection system 410 that couples the processors 402 and the memory slices 412. The interconnection system 410 is referred to herein as an inter-shave interconnect (ISI). The ISI can include a bus through which processors 402 can read or write data to any part of any one of the memory slices 412.

Figure 5:
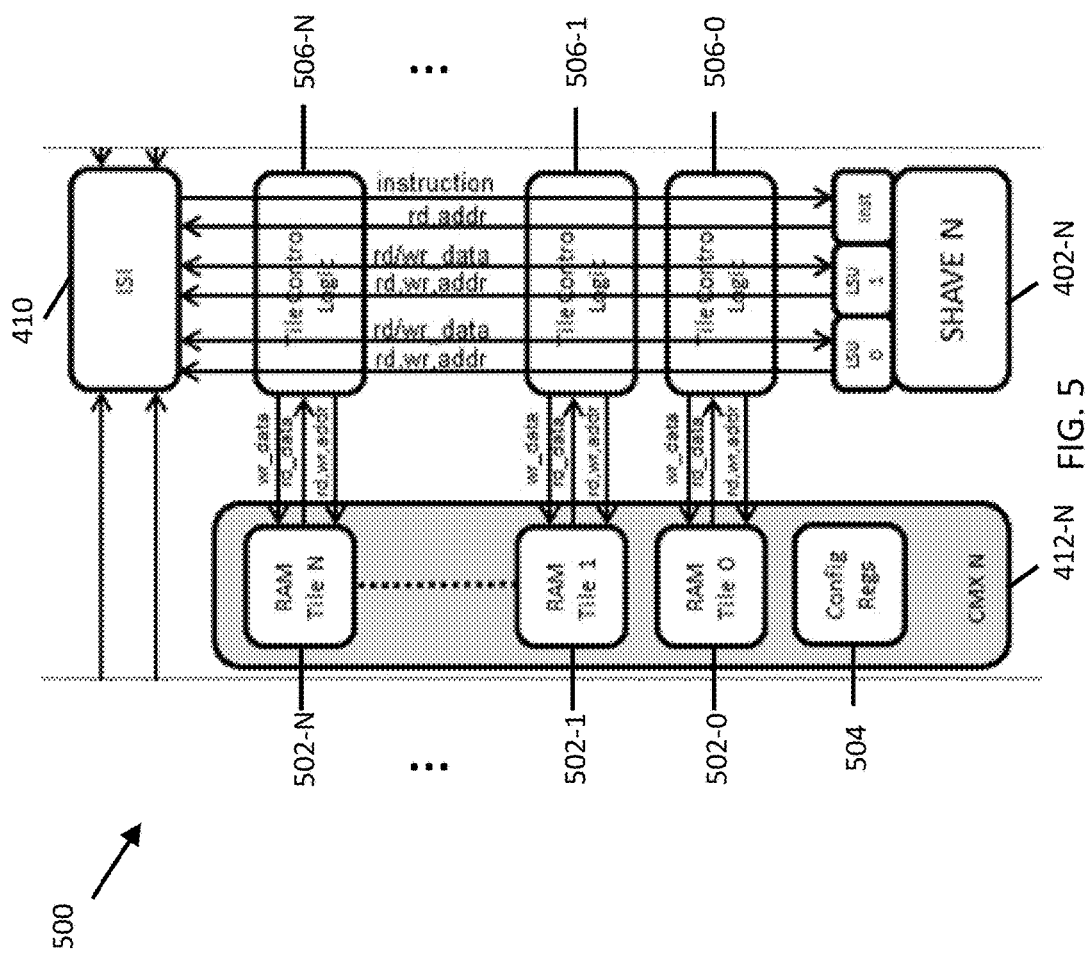
FIG. 5 illustrates a section of the parallel processing device in accordance with some embodiments.

FIG. 5 illustrates a section of the parallel processing device in accordance with some embodiments. The section 500 includes a single processor 402-N, a memory slice 412-N associated with the single processor 402-N, the ISI 410 that couples the single processor 402-N and other memory slices (not shown), and a tile control logic 506 for arbitrating communication between a tile in the memory slice 412-N and processors 402. As illustrated in the section 500, the processor 402-N can be configured to directly access the memory slice 412-N associated with the processor 402-N; the processor 402-N can access other memory slices (not shown) via the ISI.

In some embodiments, each memory slice 412-N can include a plurality of RAM tiles or physical RAM blocks 502-0 . . . 502-N. For instance, a memory slice 412-N having the size of 128 kB can include four 32 kB single-ported RAM tiles (e.g., physical RAM elements) organized as 4 k×32-bit words. In some embodiments, a tile 502 can also be referred to as a logical RAM block. In some embodiment, a tile 502 can include a single ported complementary metal-oxide-semiconductor (CMOS) RAM. The advantage of a single ported CMOS RAM is that it is generally available in most semiconductor processes. In other embodiments, a tile 502 can include a multi-ported CMOS RAM.

In some embodiments, each tile 502 can be associated with a tile control logic 506. The tile control logic 506 is configured to receive requests from processors 402 and provides access to the individual read and write-ports of the associated tile 502. For example, when a processing element 402-N wants to access data in a RAM tile 502-0, before the processing element 402-N sends the memory data request to the RAM tile 502-0 directly, the processing element 402-N can send a memory access request to the tile control logic 506-0 associated with the RAM tile 502-0. The memory access request can include a memory address of data requested by the processing element 402-N. Subsequently, the tile control logic 506-0 can analyze the memory access request and determine whether the processing element 402-N can access the requested memory. If the processing element 402-N can access the requested memory, the tile control logic 506-0 can send an access grant message to the processing element 402-N, and subsequently, the processing element 402-N can send a memory data request to the RAM tile 502-0.

As there is potential for simultaneous access by multiple processing elements, in some embodiments, the tile control logic 506 can include a clash detector, which is configured to detect an instance in which two or more processing elements, such as a processor or an accelerator, attempt to access any one of the tiles in a memory slice. The clash detector can monitor access to each tile 502 for an attempted simultaneous access. The clash detector can be configured to report to the runtime scheduler that an access clash has occurred and needs to be resolved.

Figure 6:
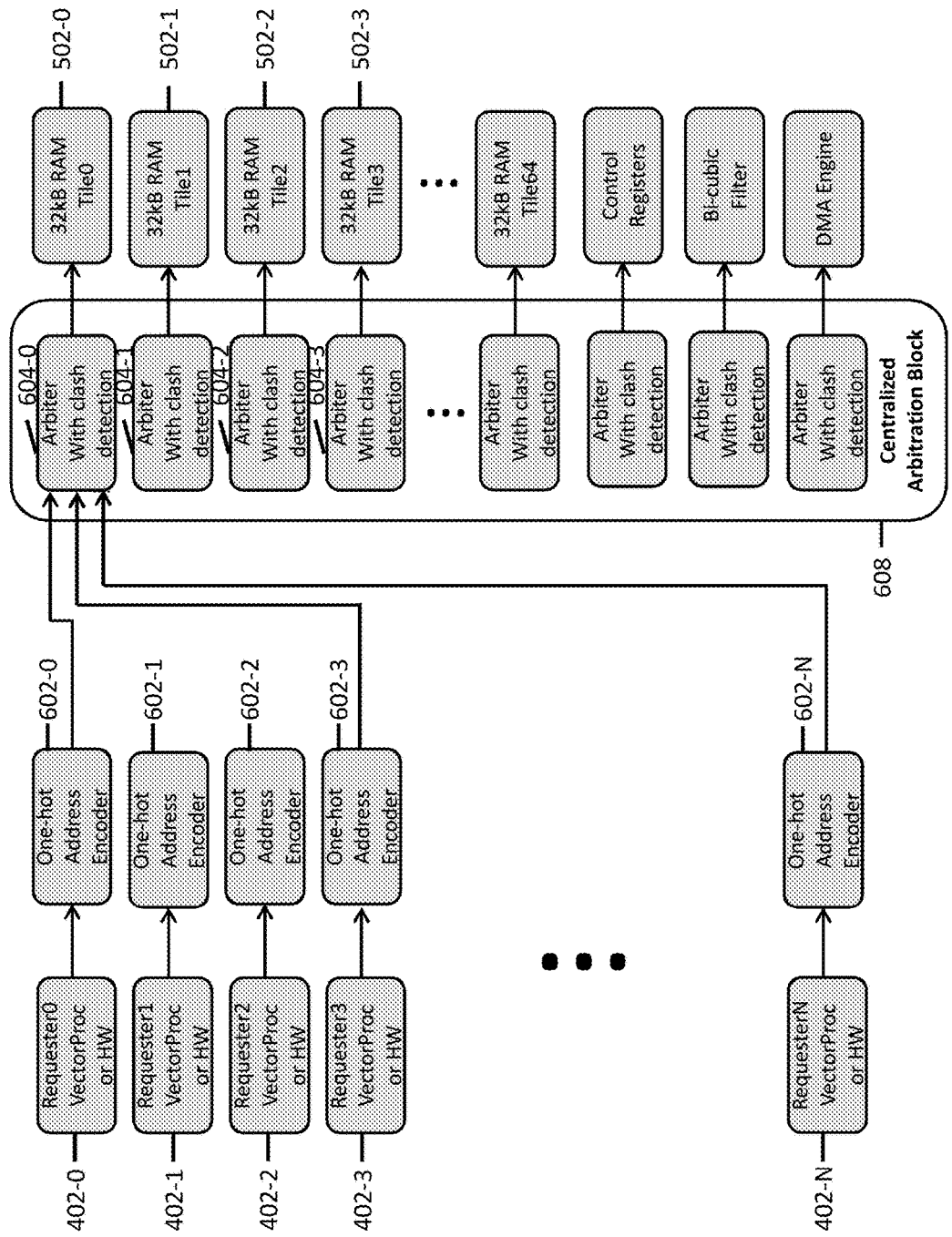
FIG. 6 illustrates a centralized clash detection system in a tile control logic in accordance with some embodiments.

FIG. 6 illustrates a centralized clash detection system in a tile control logic in accordance with some embodiments. The clash detection system can include a centralized arbitration block 608, which includes a plurality of clash detectors 604 and a plurality of one-hot address encoders 602. In some embodiments, the one-hot address encoder 602 is configured to receive a memory access request from one of the processing elements 402 and to determine whether the memory access request is for data stored in the RAM tile 502 associated with the one-hot address encoder 602. Each clash detector 604 can be coupled to one or more one-hot address encoder 602, which is also coupled to one of the processing elements 402 that can access the tile 502 associated with the clash detector 602. In some embodiments, a clash detector 604 can be coupled to all one-hot address encoders 602 associated with a particular RAM tile 502.

If the memory access request is for data stored in the RAM tile 502 associated with the one-hot address encoder 602, then the one-hot address encoder 602 can provide a bit value "1" to the particular RAM tile's clash detector 604; if the memory access request is not for data stored in the RAM tile 502 associated with the one-hot address encoder 602, then the one-hot address encoder 602 can provide a bit value "0" to the particular RAM tile's clash detector 604.

In some embodiments, the one-hot address encoder 602 is configured to determine whether the memory access request is for data stored in the RAM tile 502 associated with the one-hot address encoder 602 by analyzing the target address of the memory access request. For example, when the RAM tile 502 associated with the one-hot address encoder 602 is designated with a memory address range of 0x0000 and 0x00ff, then the one-hot address encoder 602 can determine whether the target address of the memory access request falls within the range of 0x0000 and 0x00ff. If so, the memory access request is for data stored in the RAM tile 502 associated with the one-hot address encoder 602; if not, the memory access request is not for data stored in the RAM tile 502 associated with the one-hot address encoder 602. In some cases, the one-hot address encoder 602 can use a range compare block to determine whether the target address of the memory access request falls within the address range associated with a RAM tile 502.

Once the clash detector 604 receives bit values from all one-hot address encoders 602, the clash detector 604 can count the number of "1"s in the received bit values (e.g., sum the bit values) to determine whether there is more than one processing elements 402 currently requesting access to the same RAM tile 502. If there is more than one processing element currently requesting access to the same RAM tile 502, the clash detector 604 can report a clash.

Figure 7:
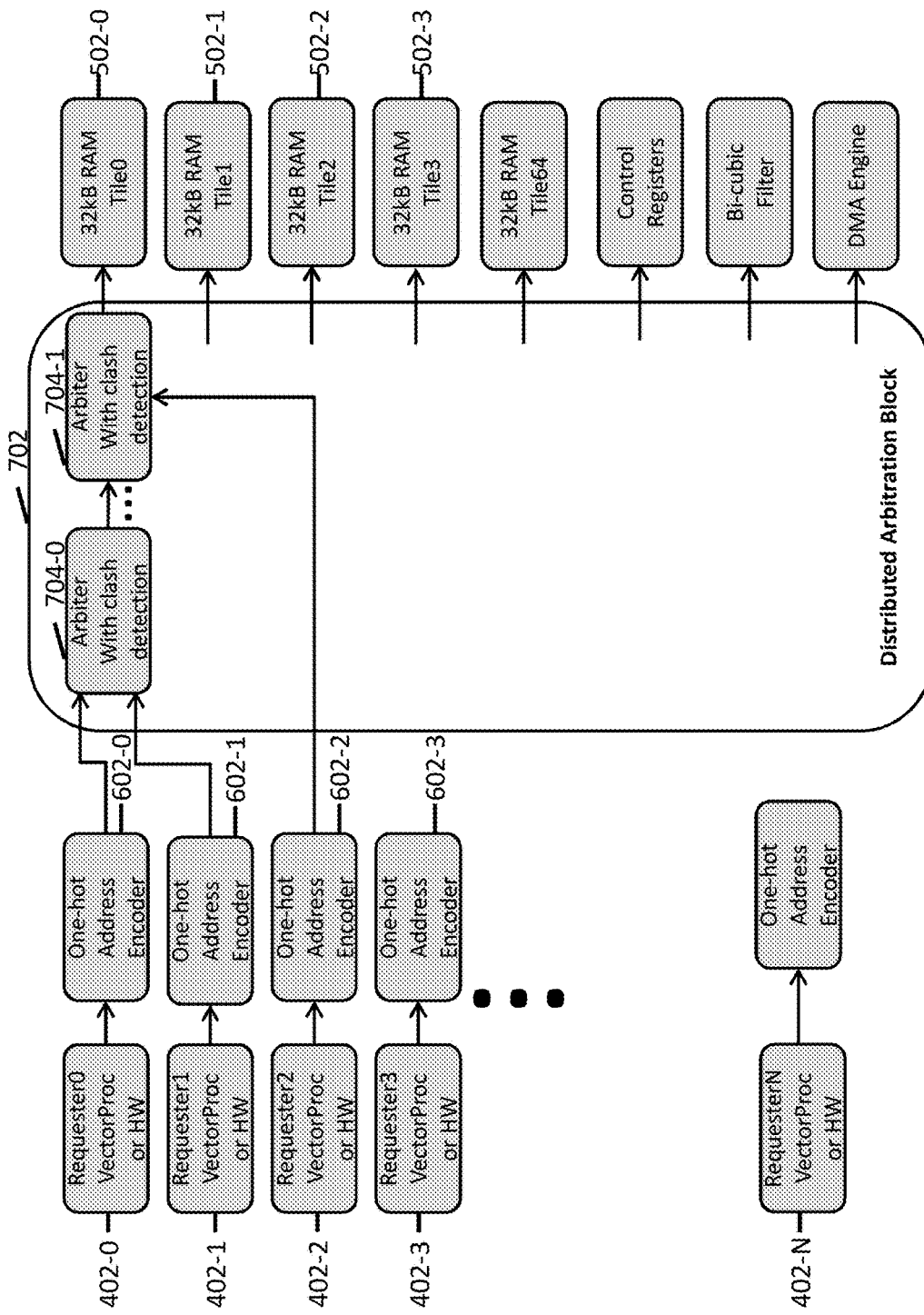
FIG. 7 illustrates a distributed clash detection system in a tile control logic in accordance with some embodiments.

FIG. 7 illustrates a distributed clash detection system in a tile control logic in accordance with some embodiments. The distributed clash detection system can include a distributed arbiter 702, which includes a plurality of clash detectors 704. The operation of the distributed clash detection system is substantially similar to the operation of the centralized clash detection system. In this case, the clash detectors 704 are arranged in a distributed manner. In particular, the distributed arbiter 702 can include clash detectors 704 that are arranged in a serial manner, where each clash detector 704 is coupled to only a subset of one-hot address encoders 602 associated with a particular RAM tile 502. This arrangement is different from the centralized clash detection system in which a clash detector 704 is coupled to all one-hot address encoders 602 associated with a particular RAM tile 502.

For example, when a particular RAM tile 502 can be accessed by 64 processing elements 402, a first clash detector 704-0 can receive a memory access request from 32 processing elements, and the second clash detector 704-1 can receive a memory access request from the remaining 32 processing elements. The first clash detector 704-0 can be configured to analyze one or more memory access requests from the 32 processing elements coupled to itself and determine a first number of elements, of the 32 processing elements coupled to itself, that are requesting access to a particular RAM tile 502-0. In parallel, the second clash detector 704-1 can be configured to analyze one or more memory access requests from the 32 processing elements coupled to itself and determine a second number of elements, of the 32 processing elements coupled to itself, that are requesting access to the particular RAM tile 502-0. Then the second clash detector 704 can add the first number and the second number to determine how many of the 64 processing elements are requesting access to the particular RAM tile 502-0.

Figure 8:
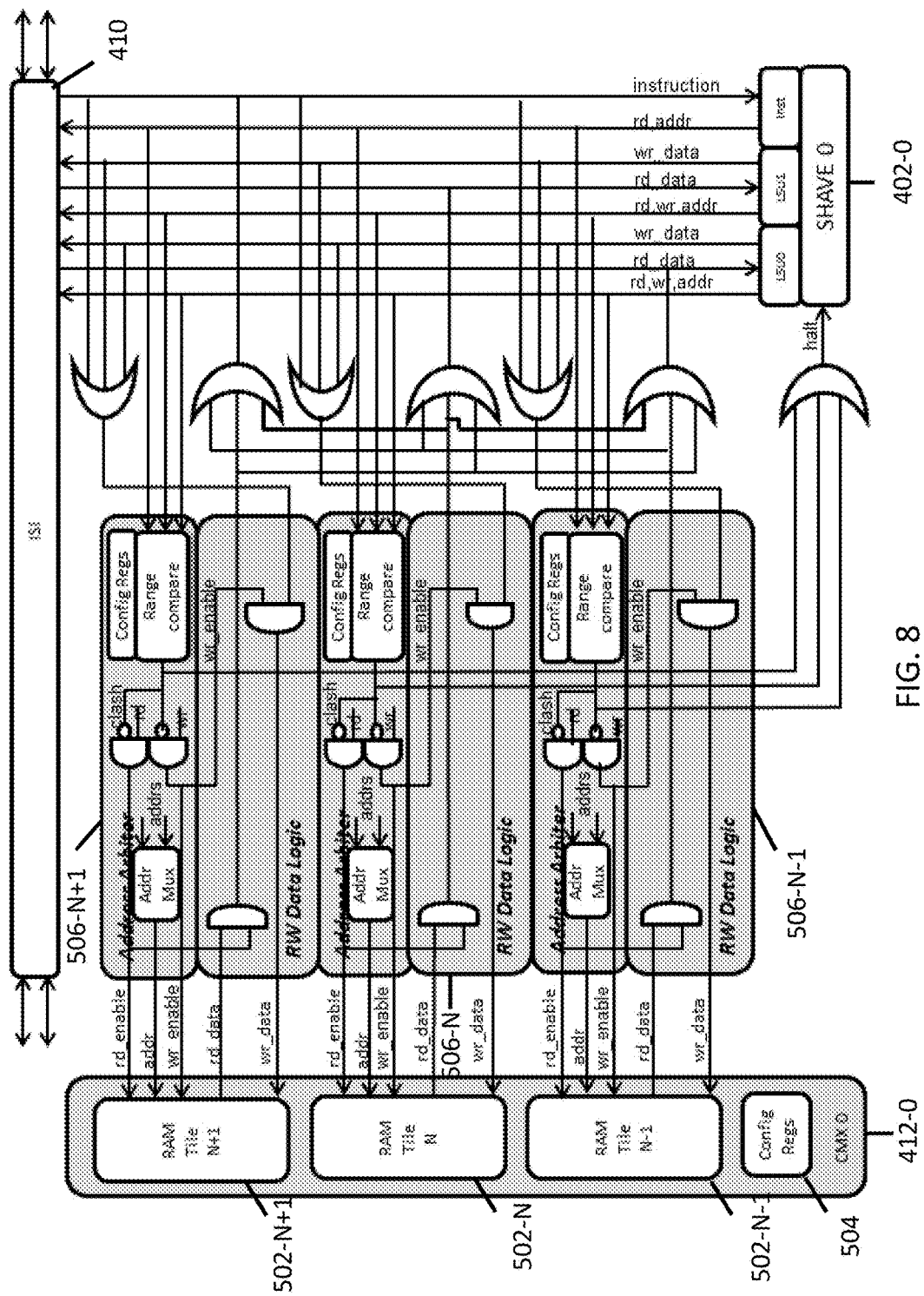
FIG. 8 shows an arbitration block for reporting a clash signal to a requester in accordance with some embodiments.

Once a clash detection system detects a clash, the clash detection system can send a halt signal to a requester 402. FIG. 8 shows an arbitration block for reporting a clash signal to a requester in accordance with some embodiments. More particularly, the outputs of the range-compare blocks in clash detection systems are combined using an OR gate to generate a halt signal to the requester. The half signal indicates that more than one processing element is attempting to access the same physical RAM sub-block within the memory slice associated with the requester. Upon receiving the halt signal, the requester can halt the memory access operation until the clash has cleared. In some embodiments, the clash can be cleared by the hardware independently of the program code.

In some embodiments, the arbitration block can operate at a cycle granularity. In such embodiments, the arbitration block allocates resources at a clock cycle granularity rather than at a task level granularity, which may include multiple clock cycles. Such cycle-oriented scheduling can improve the performance of the system. The arbitration block can be implemented in hardware so that the arbitration block can perform the cycle-oriented scheduling in real time. For example, at any particular instance, the arbitration block implemented in hardware can be configured to allocate resources for the next clock cycle.

Figure 9:
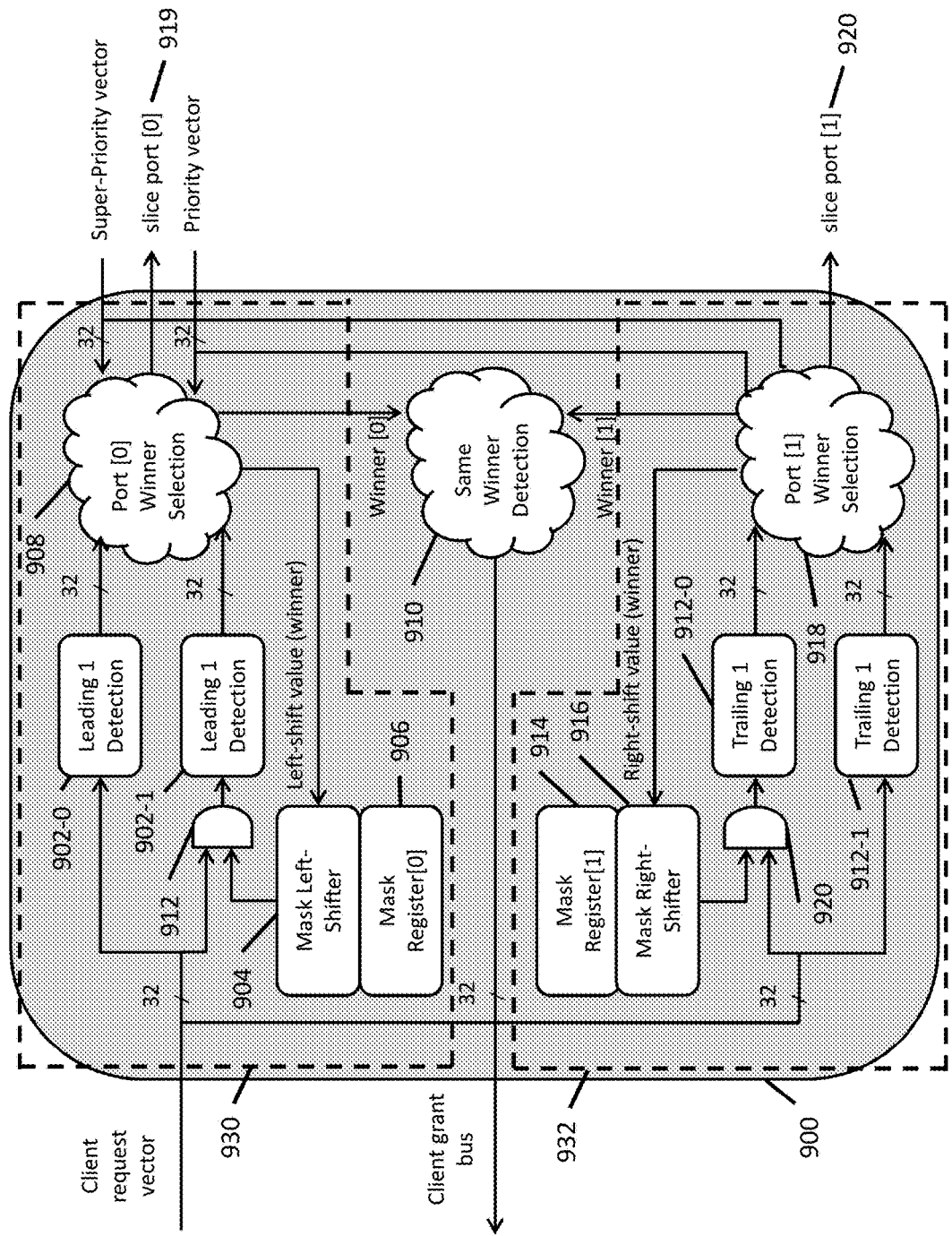
FIG. 9 illustrates a cycle-oriented arbitration block in accordance with some embodiments.

FIG. 9 illustrates a cycle-oriented arbitration block in accordance with some embodiments. The cycle-oriented arbitration block can include a port arbitration block 900. The port arbitration block 900 can include a first port selection block 930 and a second port selection block 932. The first port selection block 930 is configured to determine which one of the memory access requests (identified as a bit position in the client request vector) is assigned to the slice port [0] for accessing a memory slice coupled to the slice port [0], whereas the second selection block 932 is configured to determine which one of the client request vectors is assigned to the slice port [1] for accessing a memory slice coupled to the slice port [1].

The first port selection block 930 includes a first leading one detector (LOD) 902-0 and a second LOD 902-1. The first LOD 902-0 is configured to receive a client request vector, which can include a plurality of bits. Each bit in the client request vector indicates whether or not a message access request has been received from a requestor associated with that bit position. In some cases, the client request vector operates in an "active high" mode. Once the first LOD 902-0 receives the client request vector, the first LOD 902-0 is configured to detect a bit position, counting from the left to the right, at which the request becomes non-zero for the first time, thereby identifying the first memory access request, counting from the left to right, to the first port selection block 930. In parallel, the client request vector can be masked by an AND logic operator 912 to generate a masked client request vector using a mask generated by a mask register 906 and a mask left shifter 904. The mask register 906 can be set by a processor in communication with the mask register 906, and the mask left shifter 904 can be configured to shift, to the left, the mask represented by the mask register 906. The second LOD 902-1 can receive the masked client request vector from the AND logic operator 912, and detect the leading 1 in the masked client request vector.

The output from the first LOD 902-0 and the second LOD 902-1 are then provided to the port [0] winner selection block 908. The port [0] winner selection block 908 further receives two additional inputs: a priority vector and a super-priority vector. The port [0] winner selection block 908 is configured to determine which one of the received memory access requests should be assigned to the slice port [0], based on the priorities of the inputs. In some embodiments, the priorities of the inputs can be ranked as follows: starting with super-priority vector, which has the highest priority, priority vector which divides the masked LOD vector into priority and non-priority requests, followed by the unmasked LOD vector which has the lowest priority. In other embodiments, other priorities can be specified.

While the first port selection block 930 can be configured to determine whether the client request vector can be assigned to the slice port [0], the second port selection block 932 can be configured to determine whether the client request vector can be assigned to the slice port [1]. The second port selection block 932 includes a first trailing one detector (TOD) 912-0, a second TOD 912-1, a mask register 914, a mask right shifter 916, a port [1] winner selection block 918, and a masking AND logic block 920. The TOD 912 is configured to receive a client request vector, which can include a plurality of bits, and detect a bit position, counting from the right to the left, at which the vector becomes non-zero for the first time. The operation of the second port selection block 932 is substantially similar to the first port selection block 930 except that it operates from right to left of the input vector selecting the trailing one in the input request vector using a trailing-one detector 912-0.

The outputs of the port winner selection blocks 908, 918 are also provided to the same winner detection block 910, which is configured to determine if the same memory access request has won access to both slice port [0] and slice port [1]. If the same client request vector has won access to both slice port [0] and slice port [1], the same winner detection block 910 selects one or the slice ports to route the request and allocates the other port to the next highest ranking request in the input vector. This avoids over-allocation of resources to a particular request, thereby improving the allocation of resources to competing requesters.

The operation of the port arbitration block 900 works by starting from the left hand side of the 32-bit client request vector and masked LOD 902-1 outputs the position of the first masked request vector, if this masked request vector is not superseded by a higher priority input via the priority or super-priority vectors the requester corresponding to the LOD position wins and is granted access to port [0]. The LOD position is also used to advance the mask position via the 32-bit left-shifter 904 and is also used to compare with the port 1 LOD assignment to check if the same requester has been given access to both ports and in this case only one of the ports is granted with a flip-flop being toggled to grant access on an alternating basis between ports 0 and 1 in the case of successive same winner detections. In the case the LOD output from the masked detector 902-1 has been assigned priority via a corresponding one bit in the priority vector, the requesting client is granted 2 back-to-back cycles access to port 0. In the case that there is no leading one in the masked client request vector and no higher priority request exists the unmasked LOD wins and is assigned access to port 0. In the case of any of the above cases a 1-bit in the super-priority vector will override any of the previous requests and grant unrestricted access to port 0 to the requester.

The logic in the lower part of the diagram starts from the right-hand side of the request vector and otherwise operates in the same manner as the upper part which starts from the left-hand side of the request vector. In this case, operation of the port 1 arbitration block in terms of priorities etc. is identical to that of the port 0 portion of the logic.

Figure 10:
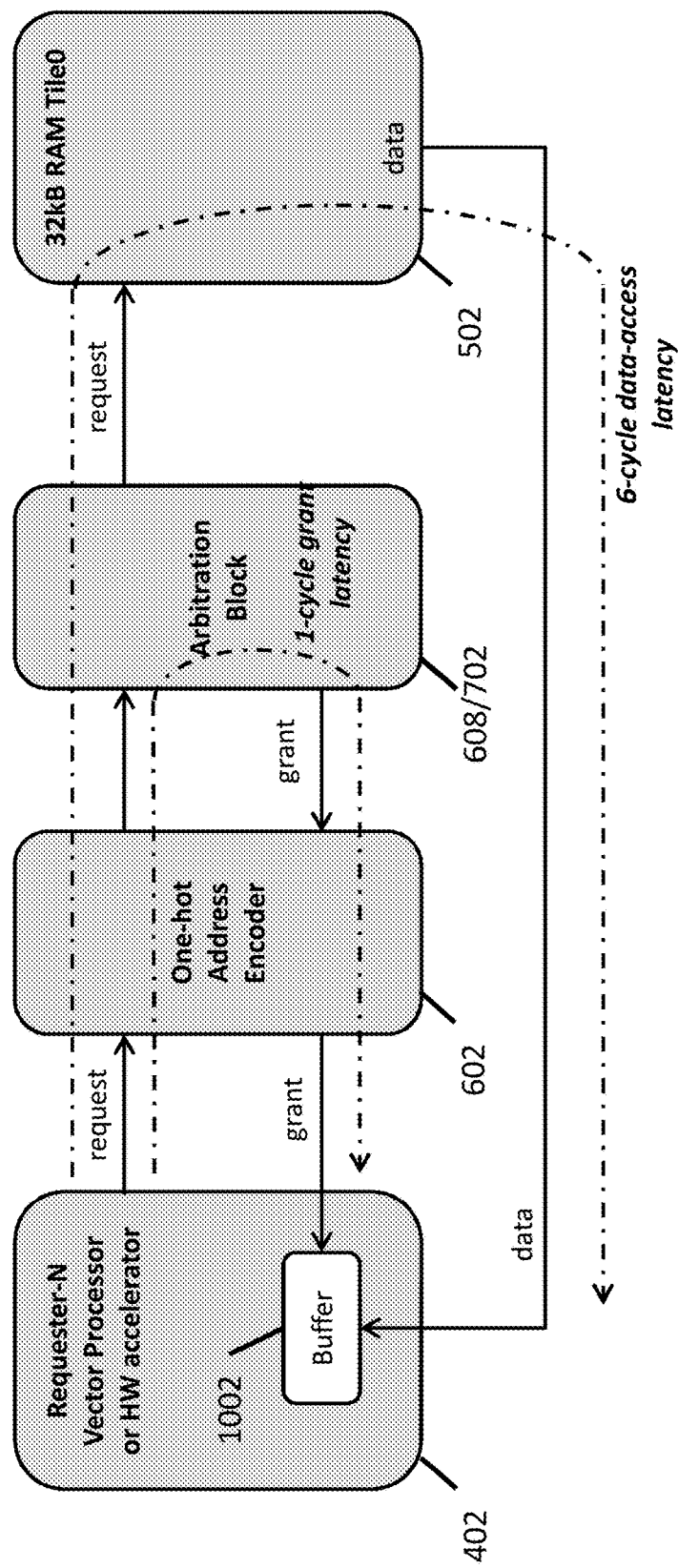
FIG. 10 illustrates a mechanism for reducing a memory access latency due to memory access arbitration in accordance with some embodiments.

In some embodiments, a processing element 402 can include a buffer to reduce a latency of memory access due to memory access arbitration. FIG. 10 illustrates a mechanism for reducing a memory access latency due to memory access arbitration in accordance with some embodiments. In a typical memory access arbitration scheme, the memory access arbitration block is pipelined, which leads to a fixed overhead arbitration penalty when allocating a shared resource, such as a RAM tile 502, to one of the plurality of processing elements (e.g., requesters). For example, when a requester 402 sends a memory access request to an arbitration block 608/702, it takes at least four cycles for the requester 402 to receive an access grant message because it takes at least one cycle in each of the following steps: (1) analyze the memory access request at the one-hot address encoder 602, (2) analyze the output of the one-hot address encoder 602 at the arbitration block 608/702, (3) send an access grant message to the one-hot address encoder 602 by the arbitration block 608/702, and (4) send the access grant message to the requester 402 by the one-hot address encoder 602. Then, subsequently, the requester 402 has to send a memory data request to the RAM tile 502, and receive data from the RAM tile 502, each of which takes at least one cycle. Therefore, a memory access operation has a latency of at least six cycles. This fixed penalty would reduce the bandwidth of the memory subsystem.

This latency issue can be addressed with a memory access request buffer 1002 maintained in the processing element 402. For example, the memory access request buffer 1002 can receive memory access requests from the processing element every clock cycle, and store the received memory access requests until they are ready to be sent to the memory arbitration block 608/702. The buffer 1002 in effect synchronizes the rate at which memory access requests are sent to the memory arbitration block 608/702 and the rate at which the data is received from the memory subsystem. In some embodiments, the buffer can include a queue. The number of elements in the buffer 1002 (e.g., the depth of the buffer) can be greater than the number of cycles for retrieving data from the memory subsystem. For example, when the RAM access latency is 6 cycles, the number of elements in the buffer 1002 can be 10. The buffer 1002 can reduce the arbitration latency penalty and improve the throughput of the memory subsystem. With the memory access request buffer, in principle, up to 100% of total memory bandwidth can be allocated between requesters.

It will be understood that a potential problem with using multiple RAM instances is that, by allowing simultaneous access by multiple processing elements to sub-instances within a bank, a memory contention may result.

The present disclosure provides at least two approaches to address the memory contention. First, care is taken in the software design, as will be described later, to avoid a memory contention and/or a memory clash by carefully laying out the data in the memory subsystem so as to reduce the contention and/or the memory clash. Furthermore, the software development tools associated with the parallel processing device can allow the memory contention or the memory clash to be reported during the software design phase. Therefore, the memory contention issues or the memory clash issues can be corrected by improving the data layout in response to the memory contention or the memory clash reported during the software design phase.

Second, as described further below, the ISI block within the architecture is configured to detect port-clashing (contention) in hardware and stall processing elements with lower priorities. For example, the ISI block is configured to analyze memory access requests from processing elements, service the sequence of memory access requests, and route memory access requests in accordance with the priority order so that all data reads or writes from all processing elements are completed in the priority order.

The priority order amongst the processing elements can be established in a number of ways. In some embodiments, the priority order may be defined statically at system design time. For example, the priority order can be coded as a reset state for system registers so that when a system powers up, the system powers up with a set of pre-assigned priorities. In other embodiments, the priority order can be dynamically determined via user-programmable registers.

In some embodiments, programmers may plan the data-layout for their software applications in order to reduce contention for shared sub-blocks of memory within a memory slice. In some cases, the planning of the data-layout can be assisted by an arbitration block. For example, the arbitration block can detect a memory contention, grant access to the memory, on the basis of priority, to a processing element associated with the highest priority task, stall other processing elements which are contending, and unroll the contention process by process until the contention has been resolved.

Figure 11:
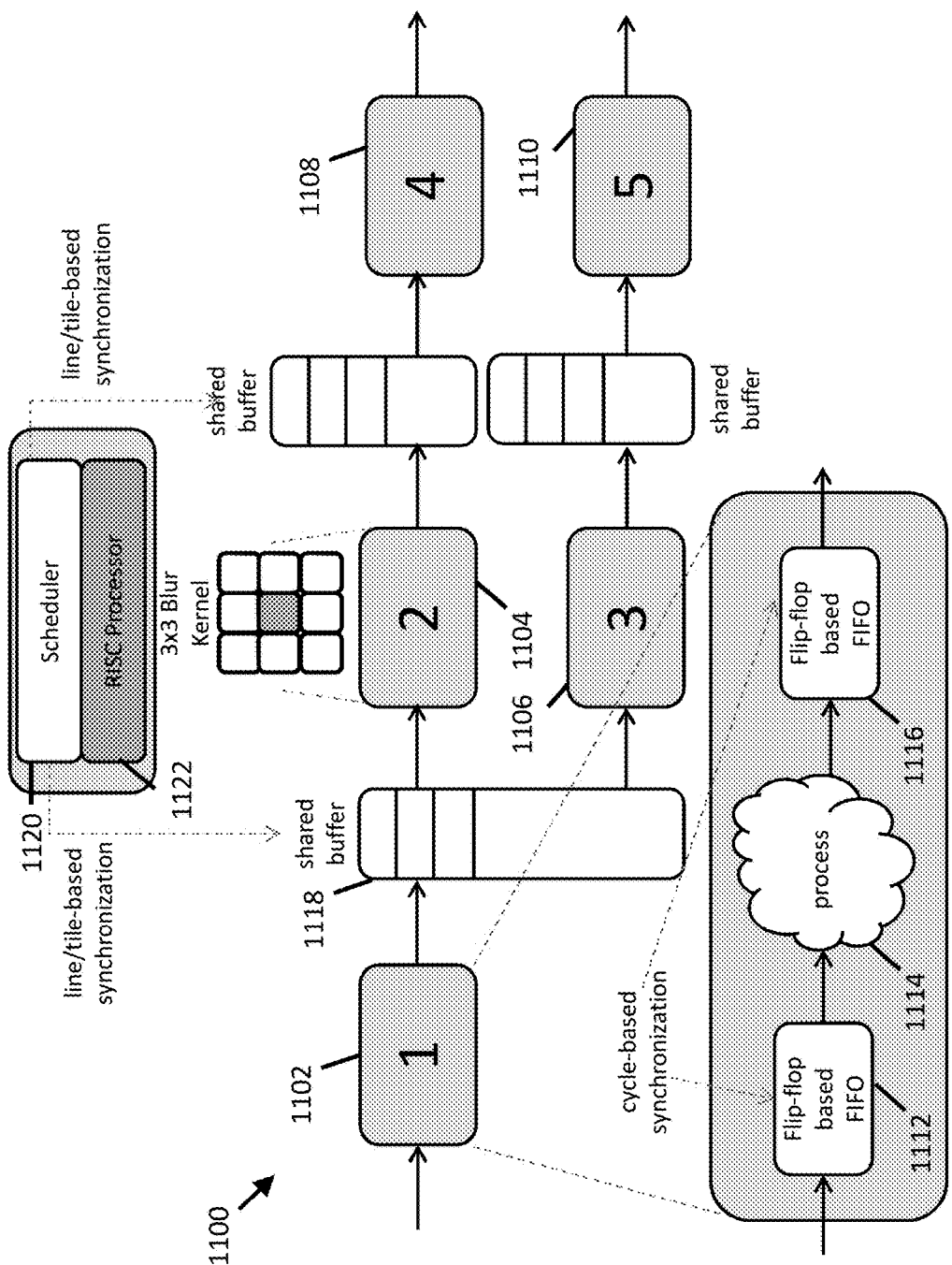
FIG. 11 illustrates an application of scheduling software in accordance with some embodiments.

FIG. 11 illustrates an application of scheduling software in accordance with some embodiments. In this application, the scheduling software can coordinate an implementation of a 3×3 blur kernel within a processing pipeline. The scheduling software can, in runtime, determine an ordering of operations and coordinate the operations by the processing elements. A flow-graph 1100 for the pipeline includes element 1-element 5 1102-1110. The element 1 1102 can include an input buffer 1112, a processing block 1144, and an output buffer 1114. The input buffer 1112 and the output buffer 1114 can be implemented using a flip-flop. In some embodiments, each of the other elements 1104-1110 can have a substantially similar structure as the element 1 1102.

In some embodiments, the element 2 1104 can include a processing element (e.g., a vector processor or a hardware accelerator) that can filter an input with a 3×3 blur filter. The element 2 1104 can be configured to receive an input from the shared buffer 1118, which temporarily maintains an output of the element 1 1102. In order to apply a 3×3 blur kernel to an input, the element 2 1104 can receive at least 3 lines of data from the shared input buffer 1118 before it can commence operation. Thus the SW scheduler 1120, which can run on a RISC processor 1122, can detect that the correct number of lines of data is contained in the shared buffer 1118 before signalling to the element 2 1104 that it can commence the filtering operation.

Following the initial signal that 3 lines of data are present, the SW scheduler 1120 can be configured to signal, to the element 2 1104, when each additional new line has been added to the rolling 3-line buffer 1118. In addition to the line-by-line synchronisation, cycle-by-cycle arbitration and synchronisation is performed for each element in the pipeline. For instance, the element 1 1102 can include a hardware accelerator which produces one complete output pixel per cycle. In order to achieve this throughput, the hardware accelerator can keep the input buffer 1112 full so the processing block 1114 has sufficient data to continue its operations. This way, the processing block 1114 can produce sufficient output to keep the throughput of the element 1102 as high as possible.

In some embodiments, a software tool chain can predict memory conflicts from analyzing software program using the memory subsystem. The software tool chain can include a graphic user interface (GUI)-based integrated development environment (IDE) (e.g., Eclipse-based IDE) from which the developer can edit code, call the compiler, assembler and perform source-level debugging when required. The software tool chain can be configured to predict memory conflicts via dynamic analysis of programs running on multiple processors using a system simulator, which models all processing, bus, memory elements and peripherals. The software tool chain can also be configured to log, in a log file or a display device, if different programs running on different processors or hardware resources attempt contemporaneous access to a particular block of a memory slice. The software tool chain can be configured to log in a cycle-by-cycle basis.

In some embodiments, the pipeline 1100 can also include one or more hardware counters (e.g., one counter for each memory instance) which are incremented each time a memory clash occurs. These counters may then be read by a hardware debugger (e.g., JTAG) and displayed on a screen or logged to a file. Subsequent analysis of the log files by the system programmer can allow memory accesses to be scheduled differently so as to reduce possibility for memory port clashing.

One key difficulty for programmers of IBM's Cell architecture (illustrated in FIG. 2) is programmatically scheduling data-transfers hundreds of cycles in advance so that data can be controlled by the DMA and be stored in local storage (LS) by the time a vector processor accesses the data. Some embodiments of the disclosed architecture can address this issue by handling the arbitration and scheduling of accesses in hardware and logging clashes in user-readable hardware counters. This allows the disclosed architecture to be used to create a high performance video/image processing pipeline.

Figure 12:
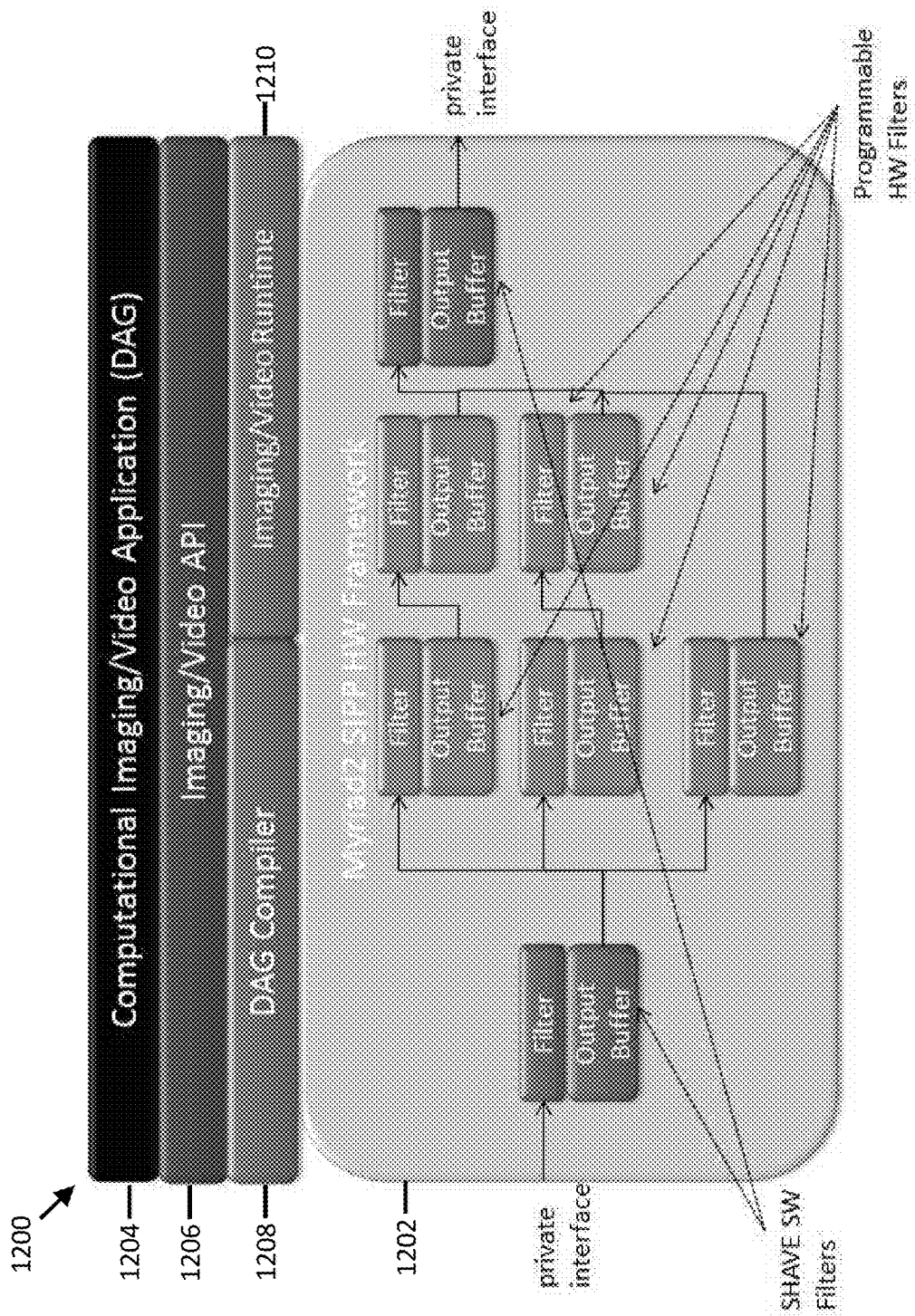
FIG. 12 provides a hierarchical structure of a system having a parallel processing device in accordance with some embodiments.

FIG. 12 provides a hierarchical structure of a system having a parallel processing device in accordance with some embodiments. The system 1200 can include a parallel computing system 1202 having a plurality of processing elements, such as filters, and a software application 1204 that runs on the parallel computing system 1204, an application programming interface (API) 1206 for interfacing the application 1204 with the parallel computing system 1202, a compiler 1208 that compiles the software application 1204 for running on the parallel computing system 1202, and a runtime scheduler 1210 for controlling operations of the processing elements in the parallel computing system 1202.

In some embodiments, the disclosed parallel processing device can be configured to operate in conjunction with a pipeline description tool (e.g., a software application) 1204, which allows image-processing pipelines to be described as a flow-graph. The pipeline description tool 1204 is capable of describing image/vision processing pipelines in a flexible way that is independent of the underlying hardware/software platform. In particular, the flow-graph, used by the pipeline description tool, allows tasks to be described independently of the processing elements (e.g., the processor and filter accelerator resources) that may be used to implement the flow-graph. The resulting output of the pipeline description tool can include a description of the directed acyclic graph (DAG) or flow graph. The description of the DAG or the flow graph can be stored in a suitable format, such as XML.

Figure 13:
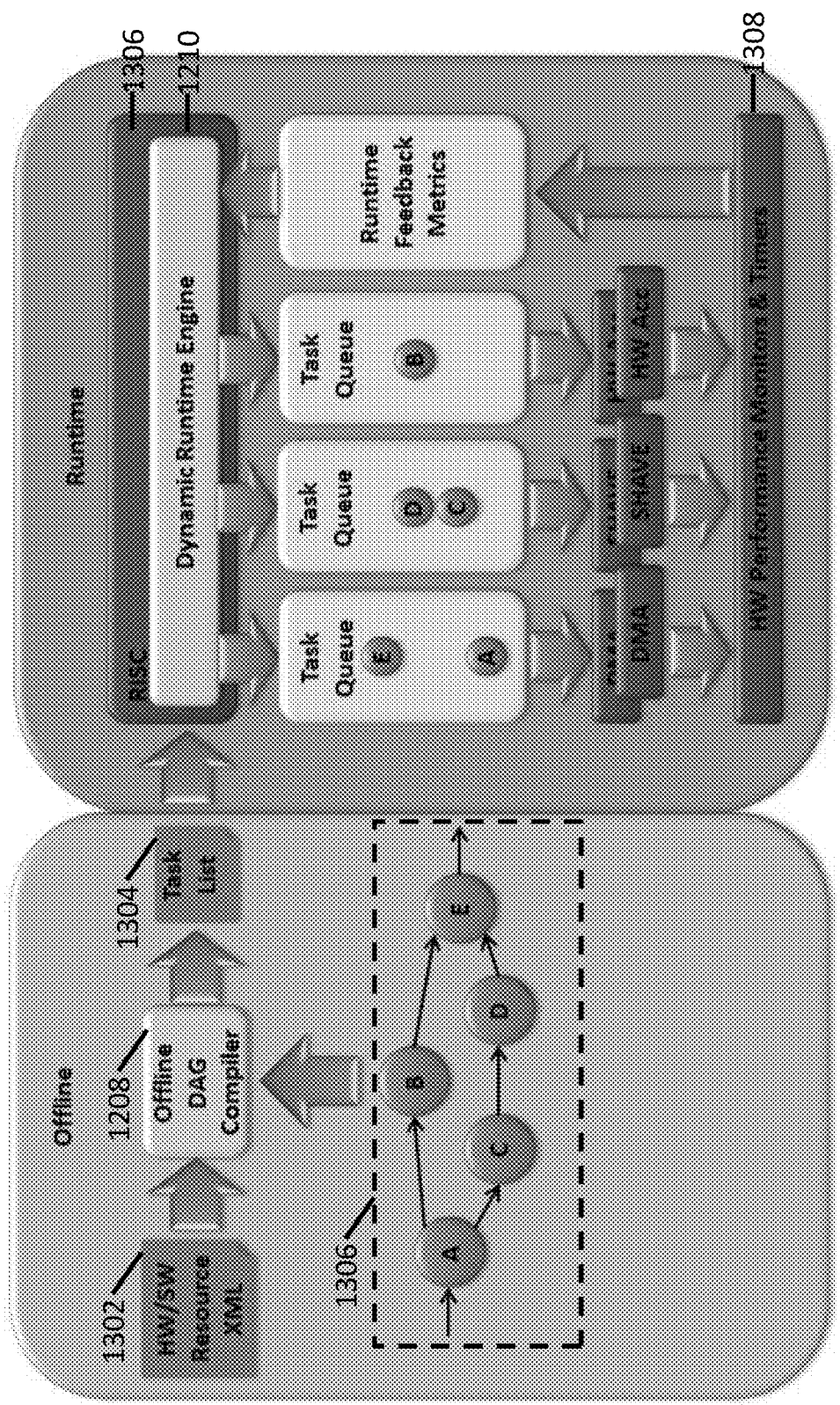
FIG. 13 illustrates how the description of the directed acyclic graph (DAG) or the flow graph can be used to control operations of a parallel processing device in accordance with some embodiments.

In some embodiments, the description of the DAG or the flow graph can be accessible to all other tools in the system 1200, and can be used to control operations of the parallel processing device in accordance with the DAG. FIG. 13 illustrates how the description of the DAG or the flow graph can be used to control operations of a parallel processing device in accordance with some embodiments.

Prior to the actual operation of the computing device, a compiler 1208 for the parallel processing device 1202 can take (1) a description of the flow-graph 1306 and (2) a description of available resources 1302, and generate a task list 1304 indicating how the DAG can be performed across multiple processing elements. For example, when the task cannot be performed on a single processing element, the compiler 1208 can split the task across multiple processing elements; when the task can be performed on a single processing element, the compiler 1208 can assign the task to a single processing element.

Figure 14A:
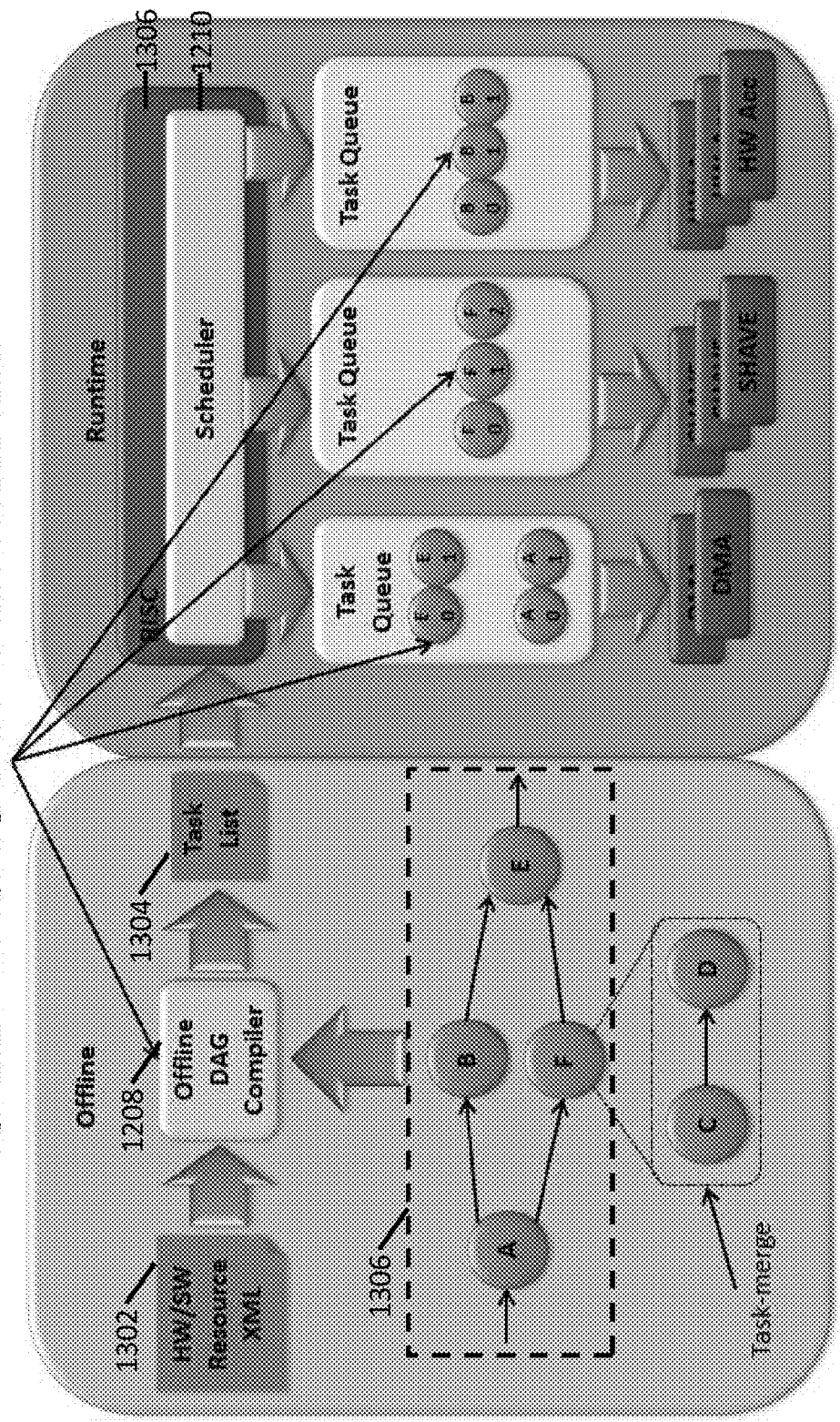
FIGS. 14A-14B illustrate the scheduling and the issuing of tasks by the compiler and the scheduler in accordance with some embodiments.

In some cases, when the task would only use a portion of the capabilities of a processing element, the compiler 1208 can fuse and schedule multiple tasks to be executed on a single processing element in a sequential manner, up to the limit that can be supported by a processing element. FIG. 14A illustrates the scheduling and the issuing of tasks by the compiler and the scheduler in accordance with some embodiments. The advantage of scheduling tasks using a compiler and the scheduler is that the compiler and the scheduler can automatically schedule tasks based on operations performed by the tasks. This is a big advantage to prior art in which a programmer had to determine manually the schedule for code running on a processing element or a group of processing elements running a particular task, including when to schedule data transfers by DMA from peripherals to CMX, from CMX to CMX block and from CMX back to peripherals. This was a laborious and error-prone task and the usage of DFGs allows this process to be automated saving time and increasing productivity.

During runtime of the computing device, the runtime scheduler 1210 can dynamically schedule the task across the available processing elements based on the task list 1304 generated by the compiler 1208. The runtime scheduler 1210 can operate on the host RISC processor 1306 in a multicore system and can schedule tasks across the processing elements, such as a plurality of vector processors, filter accelerators, and Direct Memory Access (DMA) engines, using the statistics from the hardware performance monitors and timers 1308. In some embodiments, the hardware performance monitors and timers 1308 can include stall counters, CMX-clash counters, bus cycle-counters (ISI, APB and AXI) and cycle-counters, which may be read by the runtime scheduler 1210.

In some embodiments, the runtime scheduler 1210 can assign tasks to available processing elements based on statistics from hardware performance monitors and timers 1308. The hardware performance monitors and timers 1308 can be used to increase the efficiency of the processing elements, or to perform a task using fewer number of processing elements in order to save power or allow other tasks to be computed in parallel.

To this end, the hardware performance monitors and timers 1308 can provide a performance metric. The performance metric can be a number that indicates the activity level of a processing element. The performance metric can be used to control the number of instantiated processing elements for performing a task. For example, when the performance metric associated with a particular processing element is greater than a predetermined threshold, then the runtime scheduler 1210 can instantiate an additional processing element of the same type as the particular processing element, thereby distributing the task over more processing elements. As another example, when the performance metric associated with a particular processing element is less than a predetermined threshold, then the runtime scheduler 1210 can remove one of the instantiated processing elements of the same type as the particular processing element, thereby reducing the number of processing elements performing a certain task.

In some embodiments, the runtime scheduler 1210 can prioritize the use of processing elements. For example, the runtime scheduler 1210 can be configured to determine whether the task should be preferably assigned to a processor or a hardware filter accelerator.

In some embodiments, the runtime scheduler 1210 can be configured to change the CMX buffer layout in the memory subsystem so that the system can comply with runtime configuration criteria. The runtime configuration criteria can include, for example, image processing throughput (frames per second), the energy consumption, the amount of memory used by the system, the number of operating processors, and/or the number of operating filter accelerators.

An output buffer can be laid out in memory in one of several ways. In some cases, the output buffer can be physically contiguous in memory. In other cases, the output buffer can be "chunked" or "sliced." For example, the output buffer can be split into N vertical strips, where N is the number of processors assigned to the image processing application. Each strip is located in a different CMX slice. This layout can favour processors, since each processor can locally access input and output buffers. However, this layout can be detrimental for filter accelerators because such a layout can cause a lot of clashes for filter accelerators. Filter accelerators often process data from left to right. Therefore, all filter accelerators would initiate their processes by accessing the first strip of image, which could cause a lot clashes from the start. In other cases, the output buffer can be interleaved. For example, the output buffer can be split across all 16 CMX slices, with a predetermined size interleaving. The predetermined size can be 128 bits. The interleaved layout of the output buffer can favour filter accelerators because spreading the accesses across CMX reduces the likelihood of clashes.

In some embodiments, a buffer, such as an input buffer or an output buffer, can be allocated based on whether its producers and consumers are hardware and/or software. Consumers are more important, since they typically need more bandwidth (filters usually read multiple lines and output one line). The hardware filters are programmed accordingly to the layout of the buffers (they support contiguous, interleaved and sliced memory addressing).

Figure 14B:
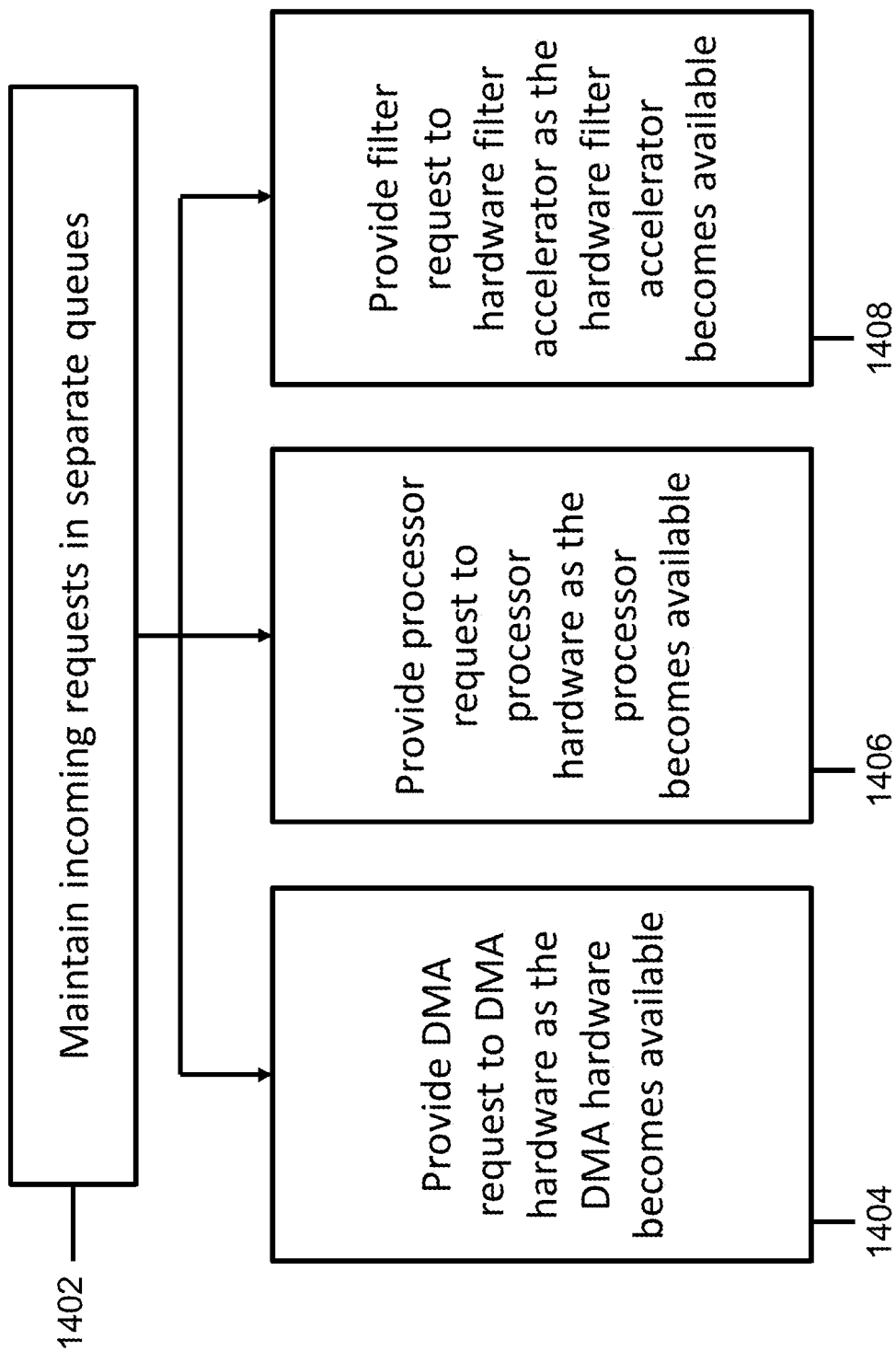

FIG. 14B shows a process for automatically scheduling a task using the compiler and the scheduler in accordance with some embodiments. The compiler determines a list of tasks to be performed by the parallel processing device based on the DAG. In step 1402, the runtime scheduler is configured to receive the list of tasks, and maintain the list of tasks in separate queues. For example, when the list of tasks include (1) tasks to be performed by the DMA, (2) tasks to be performed by a processor, and (3) tasks to be performed by a hardware filter, the runtime scheduler can store the tasks in three separate queues, for example, a first queue for the DMA, a second queue for the processor, and the third queue for the hardware filter.

In steps 1404-1408, the runtime compiler is configured to issue the tasks to associated hardware components as the associated hardware components become available for new tasks. For example, in step 1404, when the DMA becomes available to perform a new task, the runtime compiler is configured to dequeue the first queue for the DMA, and provide the dequeued task to the DMA. Likewise, in step 1406, when the processor becomes available to perform a new task, the runtime compiler is configured to dequeue the second queue for the processor, and provide the dequeued task to the processor. Also, in step 1408, when the hardware filter becomes available to perform a new task, the runtime compiler is configured to dequeue the third queue for the hardware filter, and provide the dequeued task to the hardware filter.

In some embodiments, the runtime scheduler 1210 may use the counter values from the hardware performance monitors and timers 1308 to adjust the usage of the processing elements, especially where more than one pipeline (e.g., a software application 1204) is running on the array of processing elements simultaneously, as these pipelines have not necessarily been co-designed. For instance, if the effective bus bandwidth allocated to each pipeline is less than expected, and a number of clashes occurring in accessing the CMX memory is large, the runtime scheduler 1210 may use this information to stagger execution of the 2 pipelines by modifying the order in which tasks are taken from the 2 pipeline queues, thereby reducing memory clashes.

Figure 15:
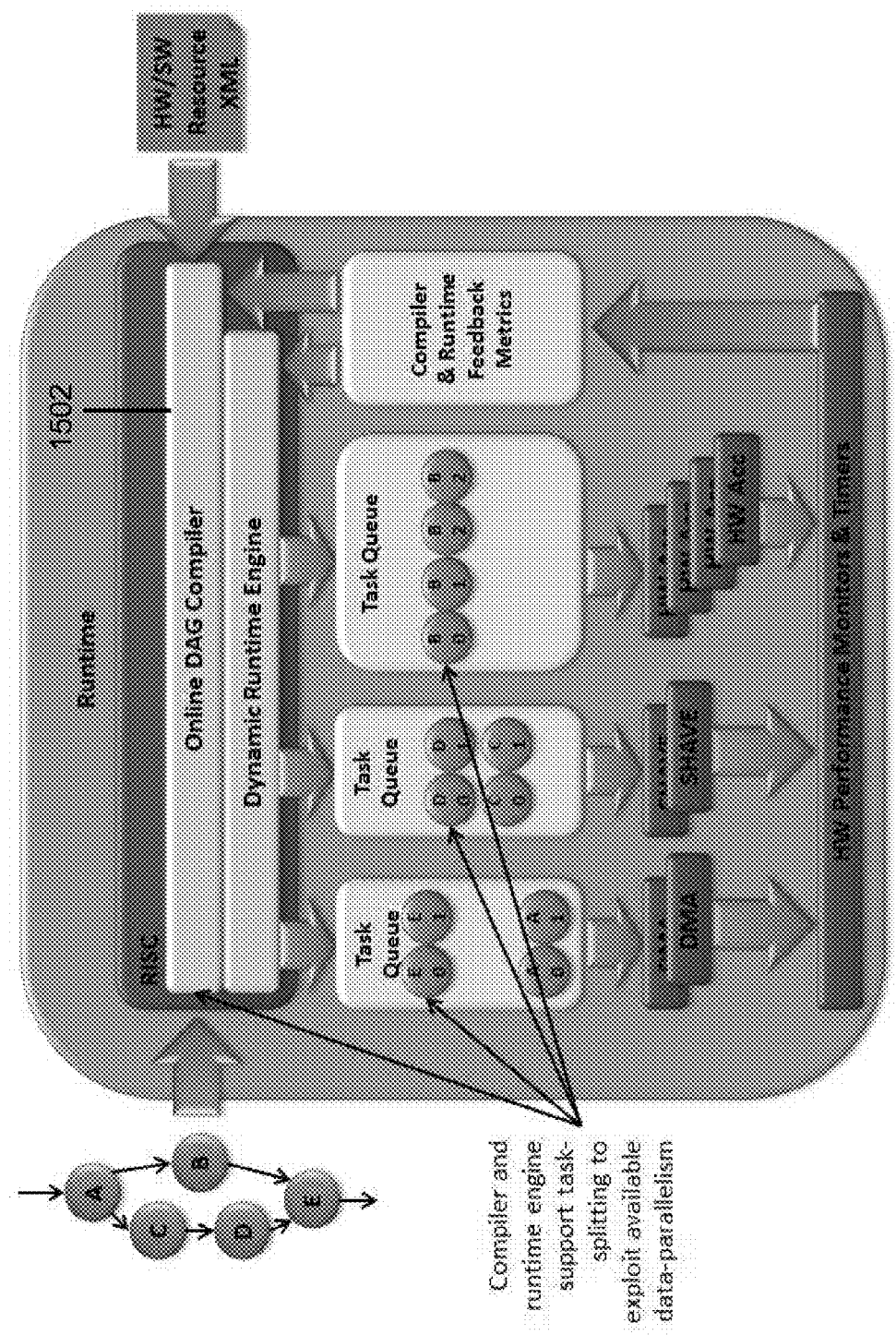
FIG. 15 illustrates an operation of a real-time DAG compiler in accordance with some embodiments.

In some embodiments, the DAG compiler can operate in real-time (e.g., online). FIG. 15 illustrates an operation of a real-time DAG compiler in accordance with some embodiments. The real-time DAG compiler 1502 can be configured to receive an input XML description of the DAG, the description of the available processing elements, and any user-defined constraints such as the number of processors, frame-rate, power-dissipation target etc. Then, real-time DAG compiler 1502 can be configured to schedule the DAG components across the processing elements, including, for example, the DMA engine, a processor, a hardware filter, and memory to ensure that the DAG as specified can satisfy the user-defined constraints when mapped to the system resources. In some embodiments, the real-time DAG compiler 1502 can determine whether the tasks in the DAG can be performed in parallel in a breath-first manner. If the breadth of the DAG is larger than the number of processing elements available to perform the tasks in parallel (e.g., the amount of available processing power is less than the parallelism of the DAG), the real-time DAG compiler 1502 can "fold" the tasks so that the tasks are performed sequentially on the available processing elements.

Figure 16:
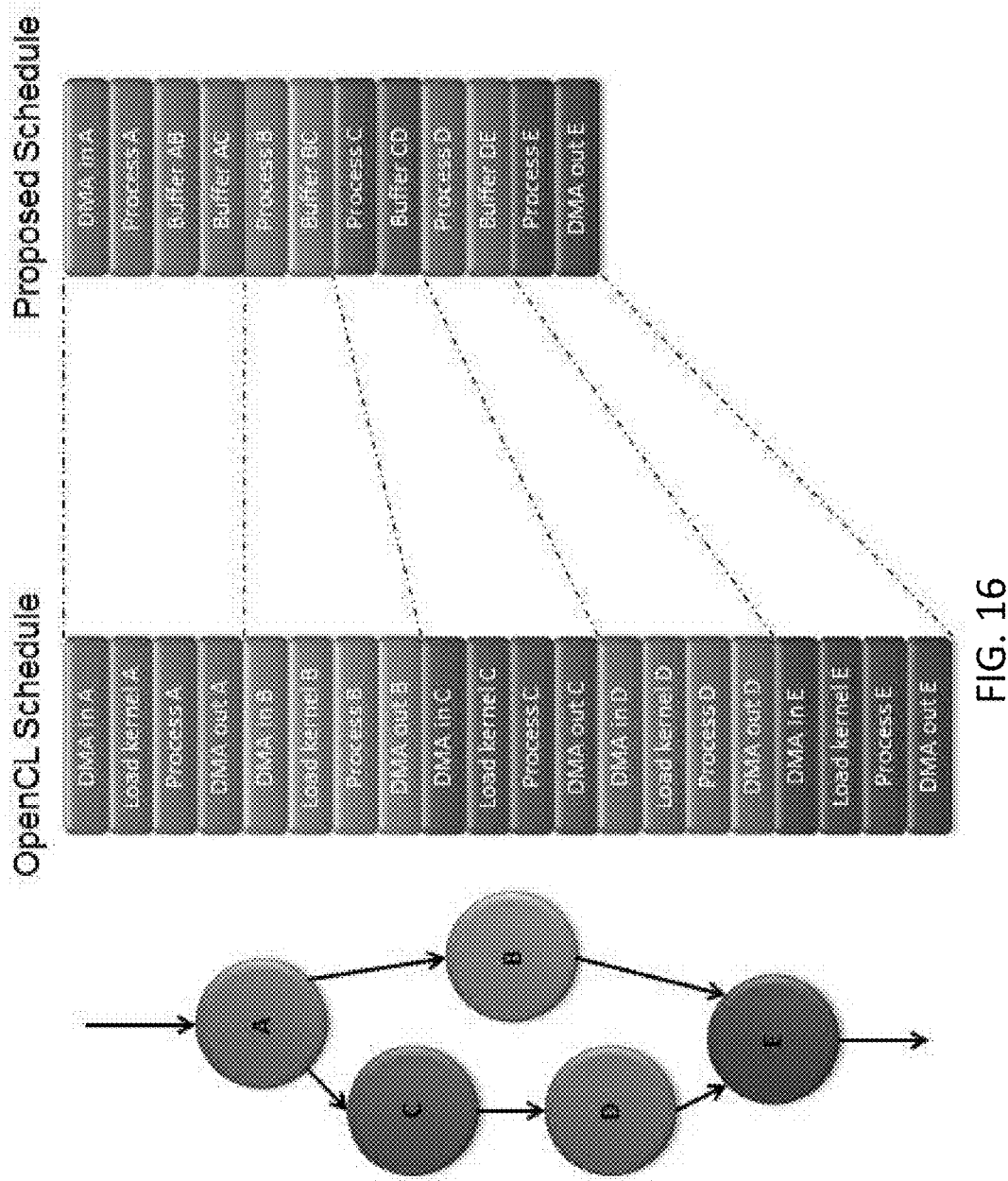
FIG. 16 compares a schedule generated by an OpenCL scheduler to a schedule generated by the proposed online DAG scheduler in accordance with some embodiments.

FIG. 16 compares a schedule generated by an OpenCL scheduler to a schedule generated by the proposed online DAG scheduler in accordance with some embodiments. The schedule produced by the proposed scheduler 1208/1502 can eliminate redundant copies and DMA transfers that are present in a typical OpenCL schedule. These data-transfers are present within an OpenCL schedule because the GPU used to perform the processing on a DAG task is remote from the processor executing the schedule. In a typical Application Processor used in a mobile device, large blocks of data are transferred back and forth between the processor executing the schedule and the GPU doing the processing. In the proposed design, all of the processing elements share the same memory space and hence no copying back and forth is required saving considerable time, bandwidth and power dissipation.

In some embodiments, when a task would only use a portion of the capabilities of a processing element, the runtime scheduler 1210 can also be configured to fuse and schedule multiple tasks to be executed on a single processing element in a sequential manner, up to the limit that can be supported by a processing element, as illustrated in FIG. 14.

In an image processing application, a scheduler can be configured to divide up processing tasks amongst processors by dividing an image into strips. For example, the image can be divided into vertical strips or horizontal strips of a predetermined width.

In some embodiments, the scheduler can predetermine the number of processors used for a particular image processing application. This allows the scheduler to predetermine the number of strips for the image. In some embodiments, a filtering operation can be performed by the processors in series. For example, when there are 5 software filters executed by the application, the processors 402 can each be configured to execute the first software filter simultaneously at a first time instance, the second software filter simultaneously at a second time instance, etc. This means that the computational load is more evenly balanced among the processors assigned to the particular image processing application. This is because the processors are configured to simultaneously execute the same list of filters in the same order.

When too many processors are assigned to the image processing application, the processors can spend a lot of time idling, waiting on hardware filter accelerators to complete the tasks. On the other hand, when too few processors are assigned to the application, the hardware filter accelerators can spend a lot of time idling. In some embodiments, the run scheduler 1210 can be configured to detect these situations, and adapt accordingly. In other embodiments, the scheduler 1210 can be configured to over-assign processors to the particular image processing applications, and allow the processors to power down once the processors have completed its tasks ahead of the hardware filter accelerators.

In some embodiments, the scheduler can use a barrier mechanism to synchronize processing elements, such as hardware filter accelerators and processors. The output of the scheduler can include a stream of commands. These commands can include (1) start commands for processing elements, such as hardware filter accelerators and processors, and (2) barrier commands. A barrier command indicates that the processing elements should wait from proceeding with a next set of commands until all processing elements in the group have reached the barrier command, even if some of the processing elements have actually completed their tasks. In some embodiments, the scheduler may provide the barrier command based on dependencies between tasks performed by the processing elements.

Figure 17:
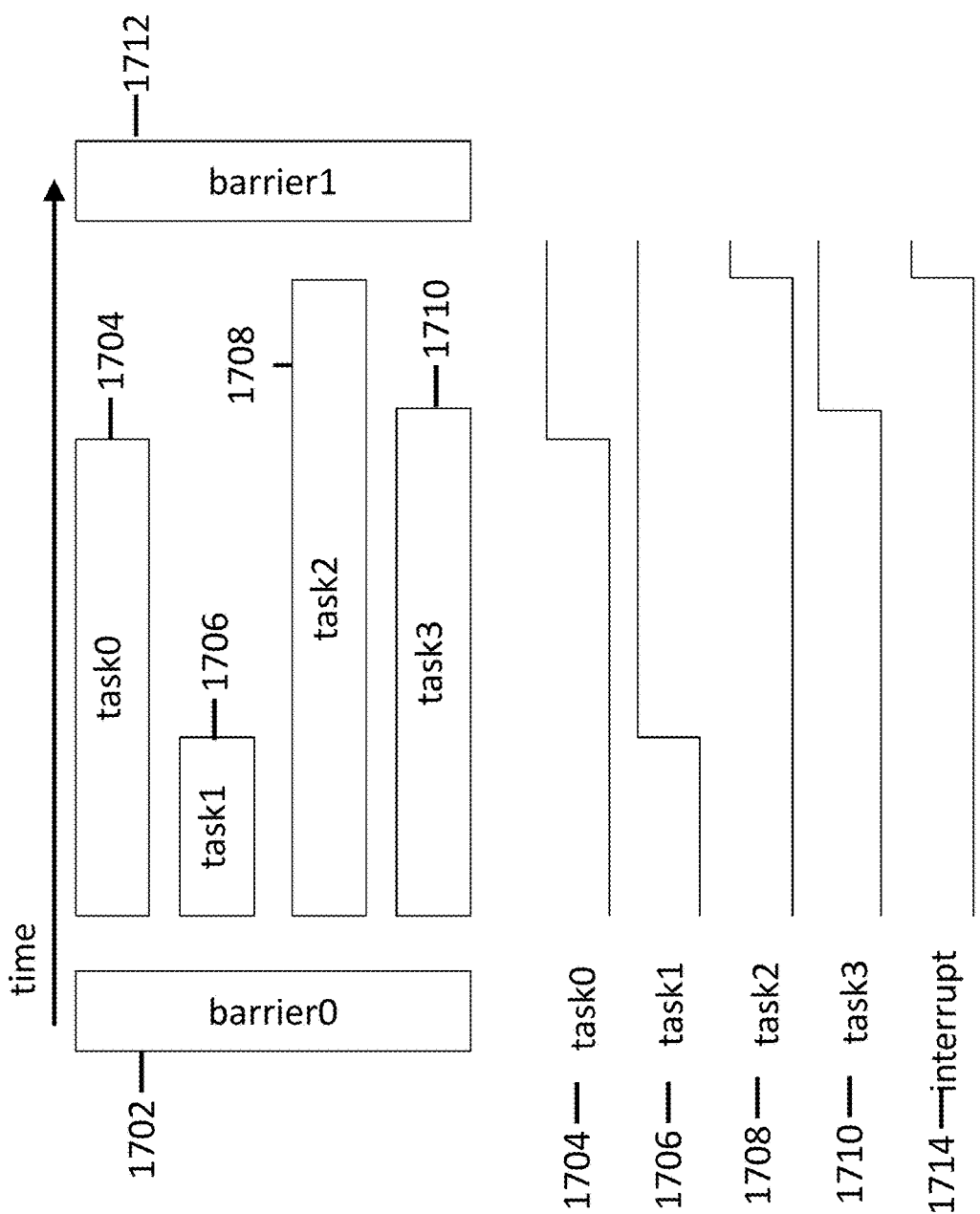
FIG. 17 illustrates a barrier mechanism for synchronizing an operation of processors and/or filter accelerators in accordance with some embodiments.

FIG. 17 illustrates a barrier mechanism for synchronizing processing elements in accordance with some embodiments. The stream of commands includes barrier commands (1702, 1712) and task commands (1704, 1706, 1708, 1710). Each task command can be associated with a processing element, and as indicated in the graph below, the task commands can be completed at different times. The scheduler can therefore insert a barrier command 1712 so that the processing elements do not proceed with future tasks until the barrier command 1712 is cleared. This barrier mechanism can be considered a temporal pipelining of the parallel tasks.

In some embodiments, the barrier mechanism is implemented in hardware using interrupt signals 1714. For example, the scheduler can program a bit mask, which specifies which processing elements belong to a group. As the processing elements complete the assigned tasks, interrupt signals associated with the respective processing elements are asserted. Once all interrupt signals associated with the processing elements in the group have been asserted, the controller of the processing elements can receive a global interrupt signal indicating that all processing elements have reached the barrier command.

In some embodiments, the interrupt sources can include SHAVE vector processors, RISC processors, hardware filters or external events. In particular the hardware filters can support various modes including a non-circular buffer mode where the input/output buffer contains a frame and the filter can be configured to issue a single interrupt either when it has processed the whole input frame or written the complete corresponding output frame. The filters are also programmable to operate on lines, patches or tiles from frames using appropriate settings for image dimensions, buffer base address/line stride etc.

One important challenge with a complex parallel processing device how to program the processing elements in the parallel processing device, particularly for embedded systems which are very power-sensitive and scarce in terms of resources like computational resources and memory. Computational imaging, video and image processing in particular are very demanding in terms of performance on embedded systems as the frame dimensions and rates are very high and increasing strongly from year to year.

The solution to this problem presented herein is to provide an Application Programming Interface (API) 1206 which allows applications to be written at high level by a programmer without intimate knowledge of the details of the multicore processor architecture 1202. Using the software API 1206, the programmer can rapidly create new image or video processing pipelines without knowing the intimate details of the implementation as details of whether functions are implemented in software on programmable processors or in hardware are abstracted away from the programmer. For instance, an implementation of a blur filter kernel is provided as a reference software implementation running on one or more processors or hardware accelerator filters. The programmer can initially use a software blur filter implementation and can switch to using the hardware filter with no change to the overall pipeline implementation as the ISI, AMC and CMX arbitration block deal with which processor and HW resources get access to the physical memory blocks and in which order, not the programmer.

While the multi-ported memory approach described above is adequate for sharing memory at high bandwidth and low-latency between identical processors it is not ideal for sharing bandwidth with other devices. These other devices may be hardware accelerators and other processors with differing latency requirements particularly in very high bandwidth applications such as computational video and image processing.

Figure 18:
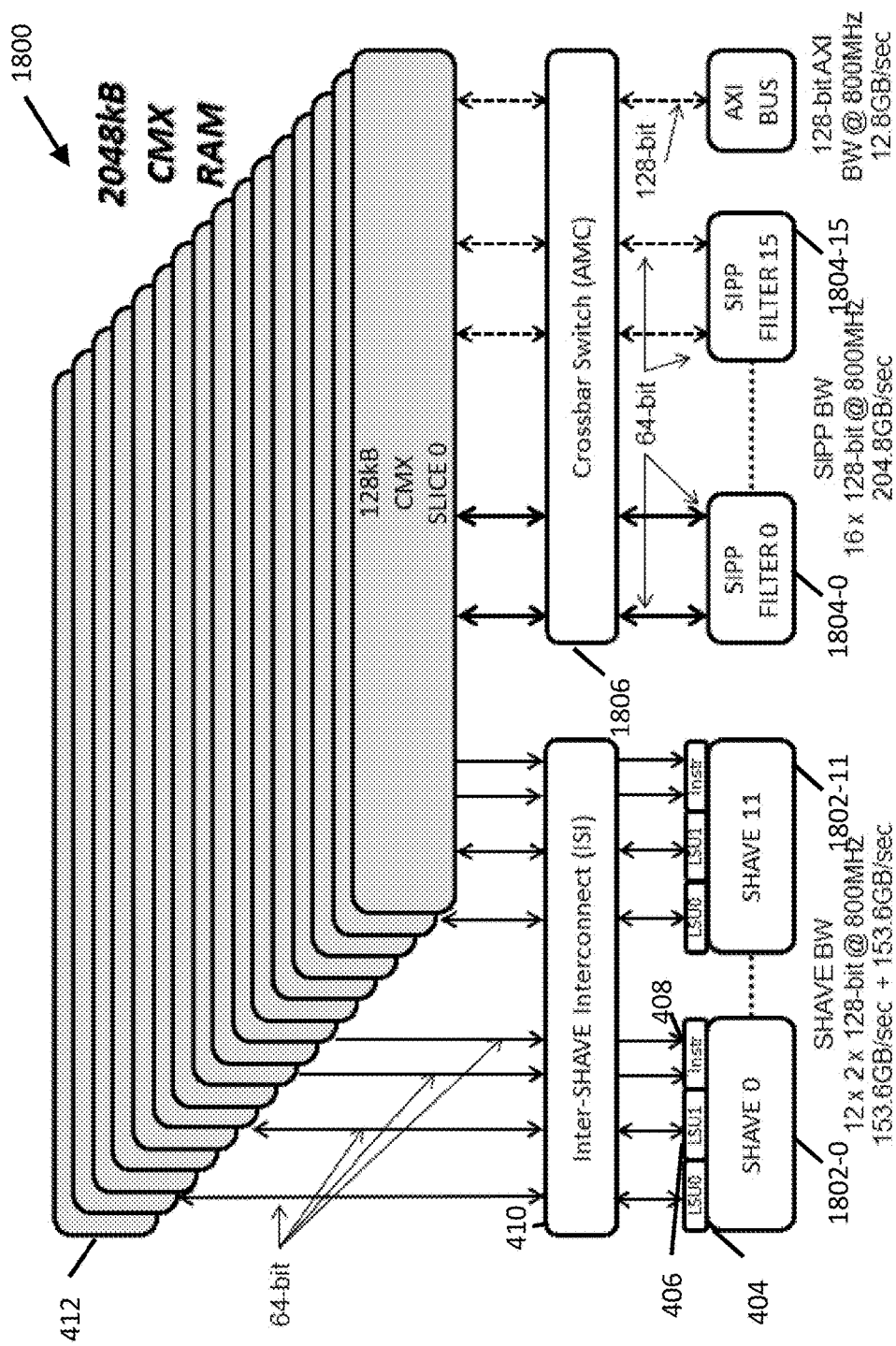
FIG. 18 illustrates the parallel processing device having different types of processing elements in accordance with some embodiments.

The disclosed architecture can be used in conjunction with a multi-ported memory subsystem to provide higher bandwidth to support more simultaneous accesses from a multiplicity of programmable VLIW processors with highly deterministic latency requirements, a large cohort of programmable image/video processing hardware filters, and bus interfaces to allow control and data-access by a conventional host-processor and peripherals. FIG. 18 illustrates the parallel processing device having different types of processing elements in accordance with some embodiments. The parallel processing device includes a plurality of processors 1802 and a plurality of filter accelerators 1804, and the plurality of processors 1802 and the plurality of filter accelerators 1804 can be coupled to the memory subsystem 412 via the ISI 410 and the accelerator memory controller (AMC) 1806, respectively.

The subsystem of AMC 1806 and Multicore Memory (CMX) subsystem 412 provides on chip storage facilitating low power streaming digital signal processing in software on the processors 1802 as well as hardware filter accelerators 1804 for particular image/video processing applications. In some embodiments, the CMX memory 412 is organized into 16 slices of 128 kB organised as 64-bit words (2 MB in total). Each processor 1802 can have direct access to a slice in the memory subsystem 412 and indirect (higher latency) access to all other slices in the memory subsystem 412. The processors 1802 may use the CMX memory 412 for storing instructions or data while hardware filter accelerators 1804 use CMX memory 412 to store data.

In order to facilitate data-sharing between heterogeneous processing elements whilst allowing latency-intolerant processors 1802 to achieve high performance when accessing a shared CMX memory 412 with HW filter accelerators 1804, the HW filter accelerators 1804 are designed to be latency tolerant. This is achieved by providing each HW filter accelerators (filters) 1804 with local FIFOs, which make timing more elastic, as well as a cross-bar switch to share access to the CMX leaving the ISI free to support inter-SHAVE communication without contention from HW filter accelerators, as illustrated in FIG. 10 in accordance with some embodiments.

In addition to external going port clashes, it is possible to clash with an incoming ISI 410 port access. If more than one external slice attempts to access the same slice of memory in any one cycle then a port clash may occur. The mapping of LSU port to ISI interconnect port is fixed, so it is possible for SHAVE 0 1802-0 to access slice 2 through LSU port 0 and SHAVE 11 (1702-11) to access slice 2 through LSU port 1 without any clashes. The ISI matrix can allow for 8×2 ports×64-bits of data to be transferred every cycle. For example, SHAVE N 1802 can access Slice N+1 through LSU port 0 and 1, and all 8 SHAVE processors can access simultaneously without any stalling.

Figure 19:
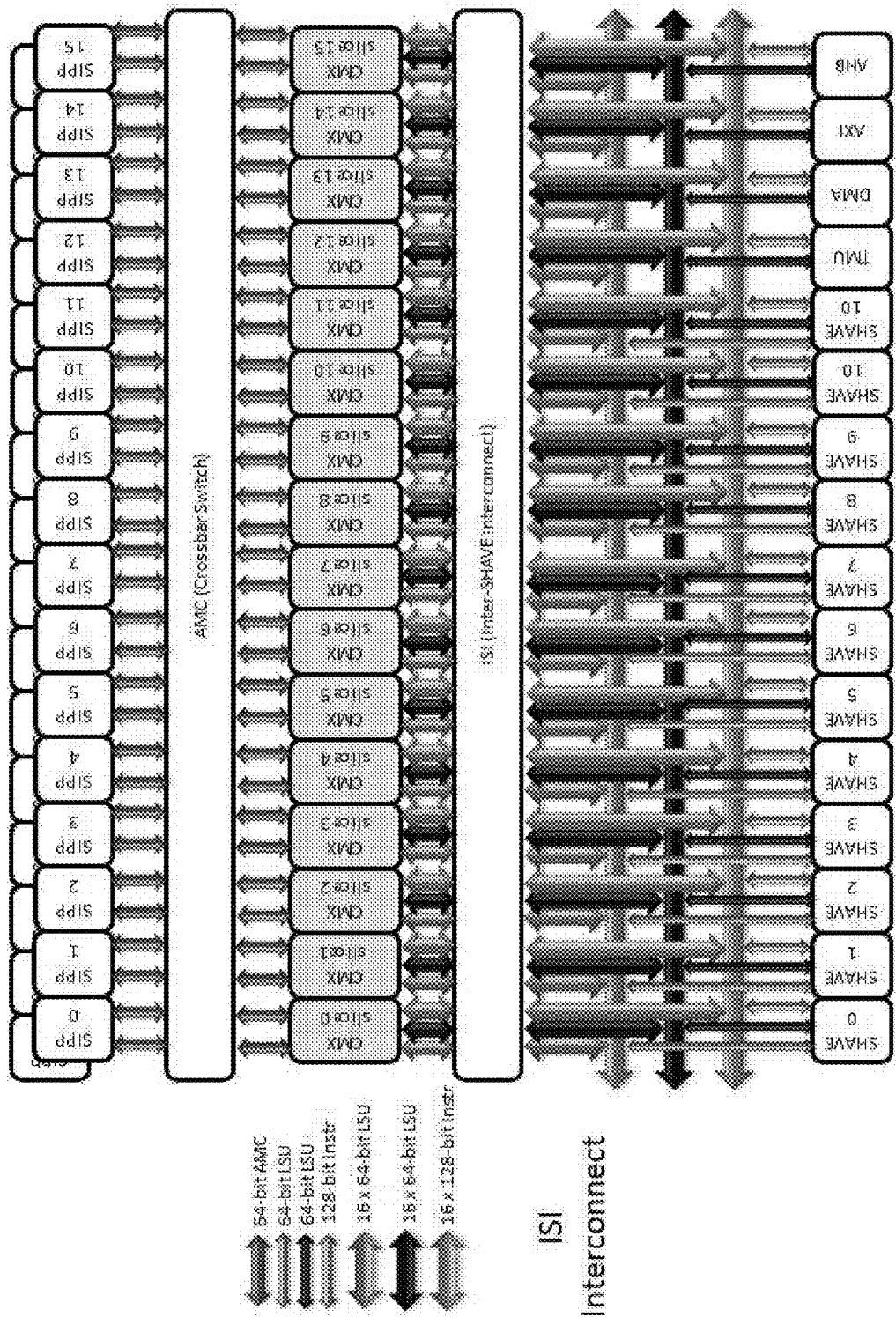
FIG. 19 illustrates the proposed multicore memory subsystem in accordance with some embodiments.

In some embodiments, the memory subsystem 412 can be logically divided into slices (blocks). FIG. 19 illustrates the proposed multicore memory subsystem in accordance with some embodiments. FIG. 19 shows a detailed bus interconnection between AXI, AHB, SHAVEs, ISI and CMX as well as filter accelerators, AMC and CMX. The diagram shows two AMC input and two AMC output ports, 2 ISI input and 2 ISI output ports, connections to L2 cache and mutex as well as internal read/write arbitration and source multiplexing to address the 4 memory tiles and FIFO as well as output destination selection of the 4 memory block outputs to ISI and AMC.

Each slice can connect to two of 16 possible ISI input sources, including 12 SHAVEs, DMA, Texture Management Unit (TMU) and AHB bus interface to the on-board host processor. Similarly, each slice has 2 output ISI ports which allow a slice to send data to 2 of 16 possible destinations including 12 SHAVEs, DMA, Texture Management Unit (TMU) and AXI and AHB bus interfaces to the on-board host processor. In the preferred implementation the slice contains 4 physical RAM blocks with input arbitration block which in turn connects to the local SHAVE processor (2×LSUs and 2×64-bit instruction ports), 2 ISI input ports, 2 AMC input ports and FIFO used for inter-SHAVE messaging as well as a messaging FIFO, L2 cache and mutual exclusion (mutex) blocks.

Figure 20:
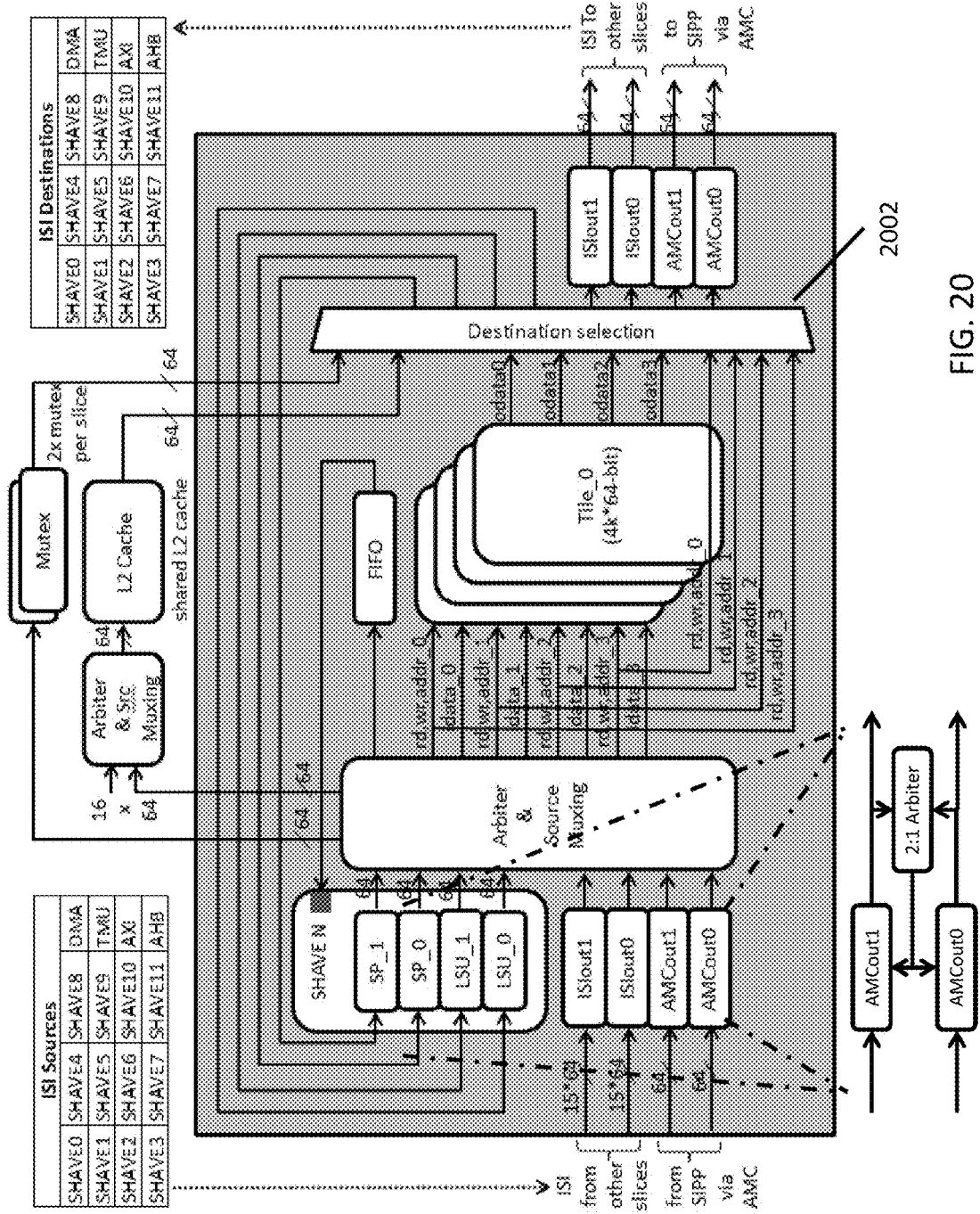
FIG. 20 illustrates a single slice of the connection matrix (CMX) infrastructure in accordance with some embodiments.

On the output path from a CMX slice, the input to the destination selection block is connected to the 4 RAM instances, along with the L2 cache and hardware mutex blocks. The outputs from the destination selection block, as illustrated in FIG. 20 as the block 2002, connects to the 2 local LSU ports and Instruction ports (SP_1 and SP_0) as well as 2×ISI output ports and 2×AMC output ports. The 2 ISI ports allow a local slice to be connected to two destinations from the 12 possible processors, DMA, TMU AXI and AHB host busses. processors are provided with access to the memory via the Inter SHAVE Interconnect (ISI) which connects to the 2×64-bit ISI input and 2×64-bit ISI output ports contained in a multicore memory subsystem slice. The high-bandwidth, low-latency deterministic access provided by the ISI interconnect reduces stalling in the processors and provides high computational throughput.

Figure 21:
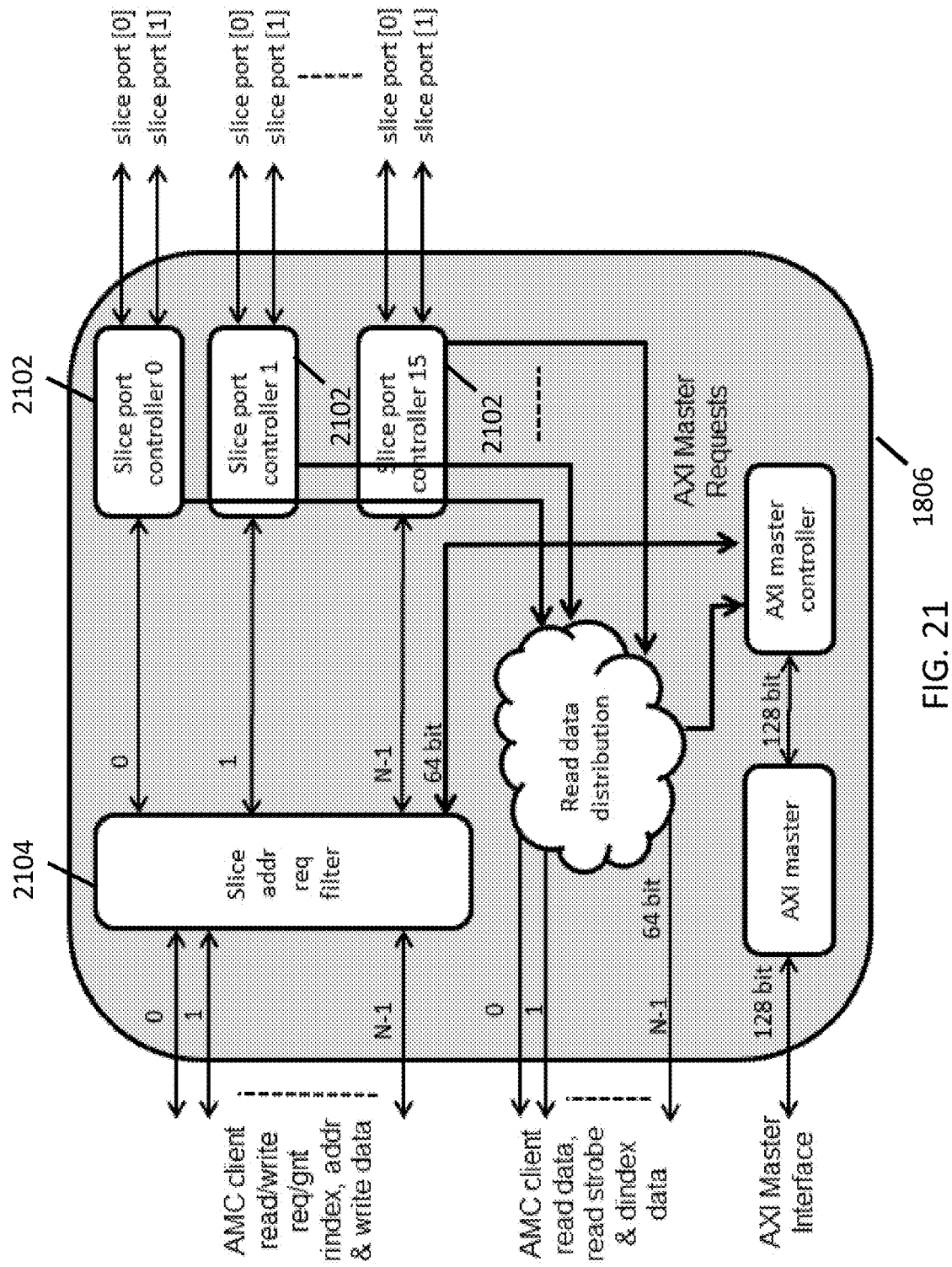
FIG. 21 illustrates an accelerator memory controller (AMC) Crossbar architecture in accordance with some embodiments.

FIG. 21 illustrates an AMC Crossbar architecture in accordance with some embodiments. The AMC crossbar 1806 can be configured to connect hardware image-processing filters 1804 to the AMC ports of the CMX multicore memory slices 412. The AMC 1806 can includes one or more slice port controllers 2102, preferably one for each CMX slice 412. The slice port controllers 2102 are in turn connected to the slice address request filter (SARF) 2104. The SARF 2104 is in turn connected to the AMC clients (in this embodiment the AMC clients are hardware image-processing accelerators). The SARF 2104 accepts read/write requests from the filter accelerators and provides request or grant signalling to them, accepting data and addresses from SIPP blocks that have been granted write access, and providing read data to those that have been granted read access. Additionally the SARF provides AXI mastering over the AXI host bus to the system host processor, which allows the host to interrogate (read/write) the CMX memory via the AMC crossbar switch.

In some embodiments, a slice port controller 2102 is provided in the AMC 1806 which communicates with the 2× read and 2× write ports in the associated CMX memory slice 412 as shown in FIG. 21. Seen from the filter accelerator side of the CMX memory subsystem 412, each hardware filter is connected to a port on the accelerator memory controller (AMC) crossbar 1806. The AMC 1806 has a pair of 64 bit read, and a pair of 64-bit write-ports, which connect it to each slice of CMX memory 412 (there are 16 slices for a total of 2 MB in the preferred implementation). Connecting the image processing hardware accelerators to the AMC 1806 via read or write-client interfaces and local buffering within the accelerators allows more relaxed latency requirements leaving more bandwidth available to the ISI and processors with highly deterministic timing allowing stalling of the processors to be reduced.

FIG. 20 illustrates a single slice of the CMX infrastructure in accordance with some embodiments. The slice contains an arbiter and source multiplexing which allows up to 4 out of eight possible 64-bit sources access to the 4 physical SRAM tiles in the CMX slice, shared L2 cache, shared mutex hardware blocks for inter-processor negotiation of mutual exclusion among threads, as well as a 64-bit FIFO used for inter-SHAVE low bandwidth messaging. The six input sources are: AMCout1 and AMCout0 which are connected the corresponding slice_port[1] and slice_port[0] ports from the ACM shown in FIG. 21; additionally 2 ISI ports, ISIout1 and ISIout0; 2×LSU ports LSU_1 and LSU_0; and finally 2× instruction ports SP_1 and SP_0 which when combined allow a 128-bit instruction to be read from CMX. The arbiter and source multiplexing generates read/write address and 64-bit data to control the 4×SRAM tiles in response to priority access from the 8 input sources. While the input of the 64-bit inter-SHAVE communications FIFO is connected to the arbiter and source multiplexer its output is only readable by the local processor in the CMX slice. In practice processors communicate with each other's messaging FIFOs via the ISIout1 and ISIout0 ports and the ISI infrastructure external to the CMX slice, which connects the CMX, slices and processors together.

In addition to arbitrating between 64 requesters on each of the 2 AMC ports in a slice shown in FIG. 20, an additional 2:1 arbiter is provided to arbitrate between AMC ports 1 and 0. The purpose of this 2:1 arbiter is to prevent one or other of the 2 AMC ports from saturating all of the AMC port bandwidth, which could lead to excessive stalling on one of the requesting ports. This enhancement provides more balanced allocation of resources in the presence of multiple heavy requesters of port bandwidth and hence higher sustained throughput for the overall architecture. Similarly a 2:1 arbiter arbitrates between the 2 processor ports SP1 and SP 0 for similar reasons.

The arbitration and multiplexing logic also controls access by the processors, either directly or via the ISI to a shared L2 cache, via a second level of arbitration which shares access on a strictly round-robin basis between 16 possible sources, where one 64-bit port is connected between the second level arbiter and each of the 16 CMX slices. Similarly the same logic allows access to the 32 hardware mutexes which are used for inter-processor negotiation of mutual exclusion among threads running on the 12 on-board processors and 2×32-bit RISC processors (via the AHB and AXI bus connections on the ISI).

The priority in the preferred implementation is that SP_1 and SP_0 have the highest priority, then LSU_1 and LSU_0, followed by ISIout1 and ISIout0 and finally AMCout1 and AMCout0 and finally the FIFO have the lowest priority. The reason for this priority assignment is that SP_1 and SP_0 control program access by the processor to CMX and the processor will stall immediately if the next instruction is not available, followed by LSU_1 and LSU_0 which will again cause the processor to stall; similarly ISIout1 and ISIout0 come from other processors and will cause them to stall if data is not immediately available. The AMCout1 and AMCout0 ports have the lowest priority as they have built-in FIFOs and hence can tolerate a lot of latency before stalling. The processor FIFO is only required for low bandwidth inter-processor messaging and hence has the lowest priority of all.

Once the arbiter has allowed access to up to 4 sources to the 4 SRAM tiles, L2 cache, mutexes and FIFO the output data from the six read-data sources including 4 SRAM tiles, L2 cache and mutexes is selected and directed to up to 4 out of 8 possible 64-bit destination ports; 4 on the processor associated with the slice (SP_1, SP_0, LSU_1 and LSU_0); 2 associated with the ISI (ISIout1 and ISIout0) and finally 2 associated with the AMC (AMCout1 and AMCout0). No prioritisation is required in the output multiplexer as only 4 64-bit sources need be distributed to 8 destination ports.

Figure 22:
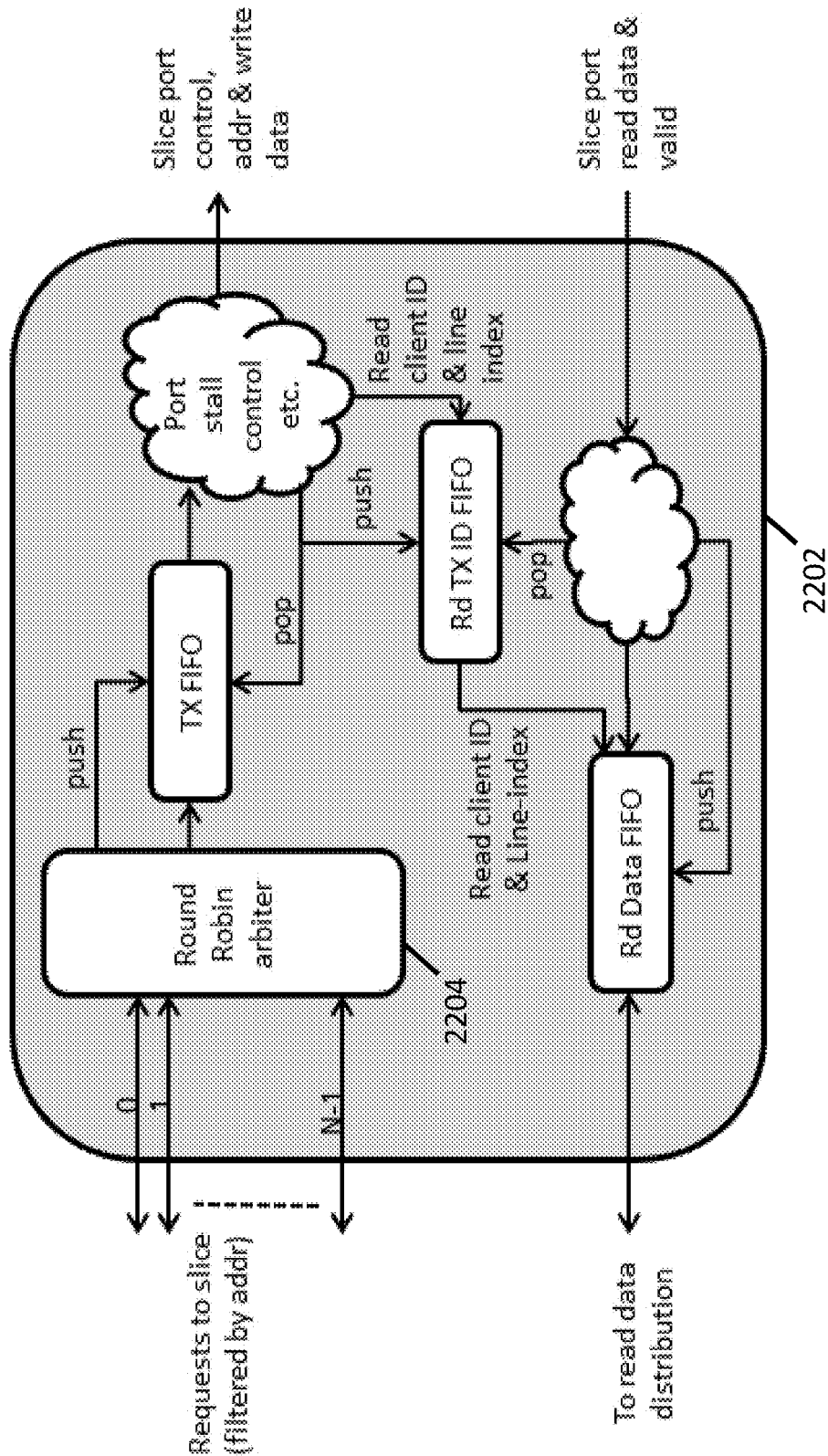
FIG. 22 illustrates an AMC crossbar port controller in accordance with some embodiments.

FIG. 22 illustrates an AMC crossbar port controller in accordance with some embodiments. The AMC crossbar port controller 2202 includes a round-robin arbiter 2204, which connects the port controller 2202 to the Accelerators 1804 whose requests have been filtered via the processor. The arbiter can then push valid requests from AMC clients onto the port-controller FIFO. In the case of read requests a response to the request (read-client ID and line index) is pushed onto the read TX ID FIFO. Returned slice port data and valid signals are input into the port-controller read logic which pops Read client ID and line indices from the Rd TX ID FIFO and pushes corresponding slice port read data and valid signals onto the Rd Data FIFO from where it can be read by the requesting AMC client. On the CMX side of the FIFO the port stall logic pops requests from the FIFO and provides slice port control to the 2×AMC input ports on the associated CMX memory slice.

The number of read and write client interfaces to the CMX are separately configurable. Any client may address any slice (or slices) of CMX. With 16 slices in CMX, 2 ports per slice and a system clock frequency of 600 MHz the maximum total data memory bandwidth which may be supplied to the clients is 143 GB/s: Max bandwidth=600 MHz*(64/8)*2*16=1.536e11 B/s=143 GB/s.

At the higher clock-rate of 800 MHz the bandwidth rises to 191 GB/sec. The AMC arbitrates between simultaneous accesses on its client read/write interfaces of the hardware accelerator blocks connected to it. A maximum of two read/write accesses may be granted per slice per clock cycle, giving a maximum slice memory bandwidth of 8.9 GB/s at a system clock frequency of 600 MHz. Client access is not restricted to CMX address space. Any access falling outside of CMX address space is forwarded to the AMC's AXI bus master.

Figure 23:
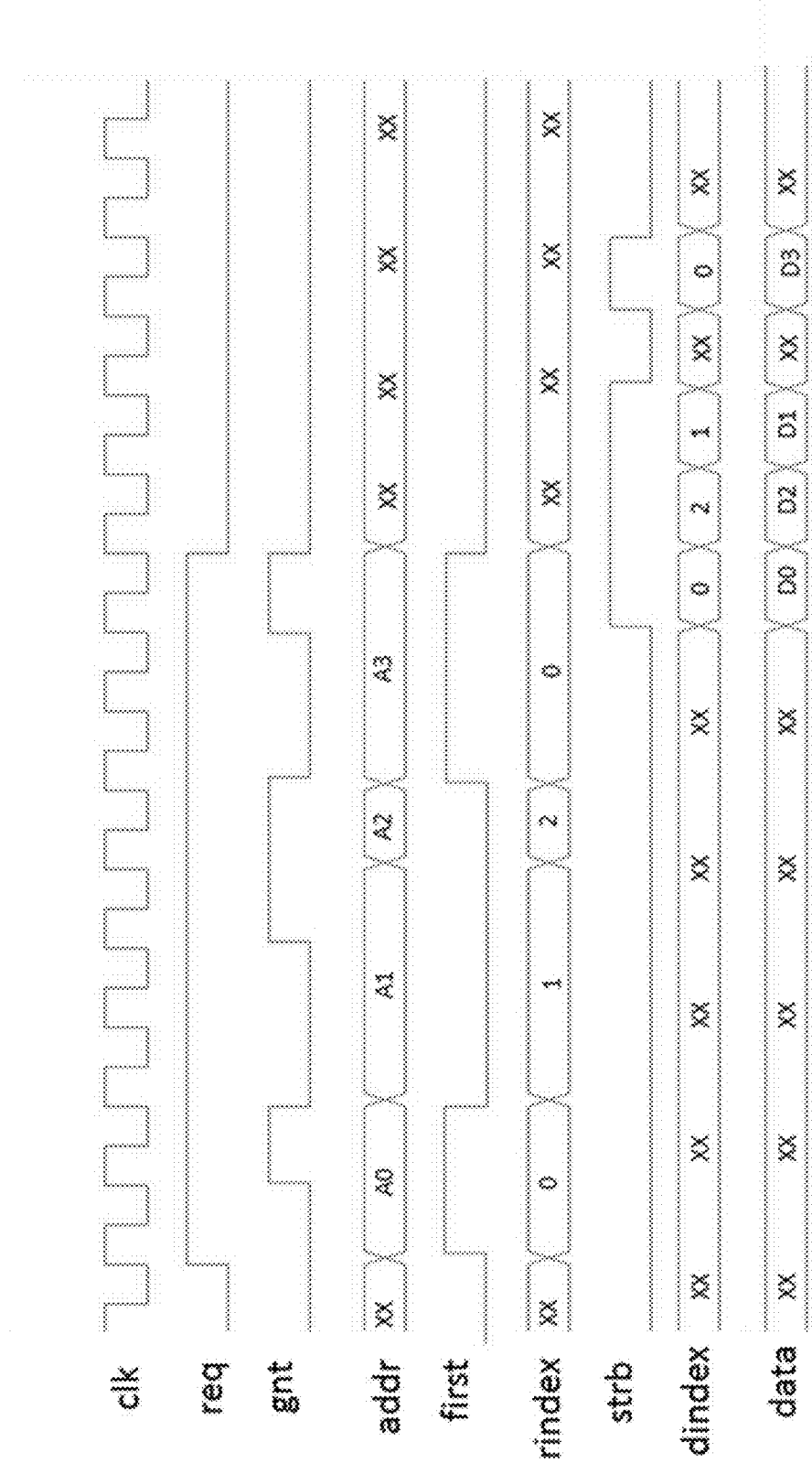
FIG. 23 illustrates a read operation using an AMC in accordance with some embodiments.

FIG. 23 illustrates a read operation using an AMC 1806 in accordance with some embodiments. In this illustration, 4 data words are read from address range A0-3. The AMC client (e.g., a filter accelerator 1804) first asserts a request on the port controller input. The port controller 2202 responds by issuing a grant signal (gnt) which in turn causes the client to emit the addresses A0, A1, A2 and finally A3. The corresponding rindex values appear on the rising edge of the clock (clk) corresponding to each grant. It can be seen that the timing on the client side can be quite elastic when compared to the index addresses and data, which are output from the CMX slice to the port-controller. The deterministic timing on the CMX side of the port-controller allows efficient shared access to the CMX between AMC clients and processors which are very sensitive to latency, while the FIFOs allow and local storage in the AMC clients allows timing to be highly variable on the AMC client (e.g., filter accelerator) side of the CMX memory subsystem 412.

Figure 24:
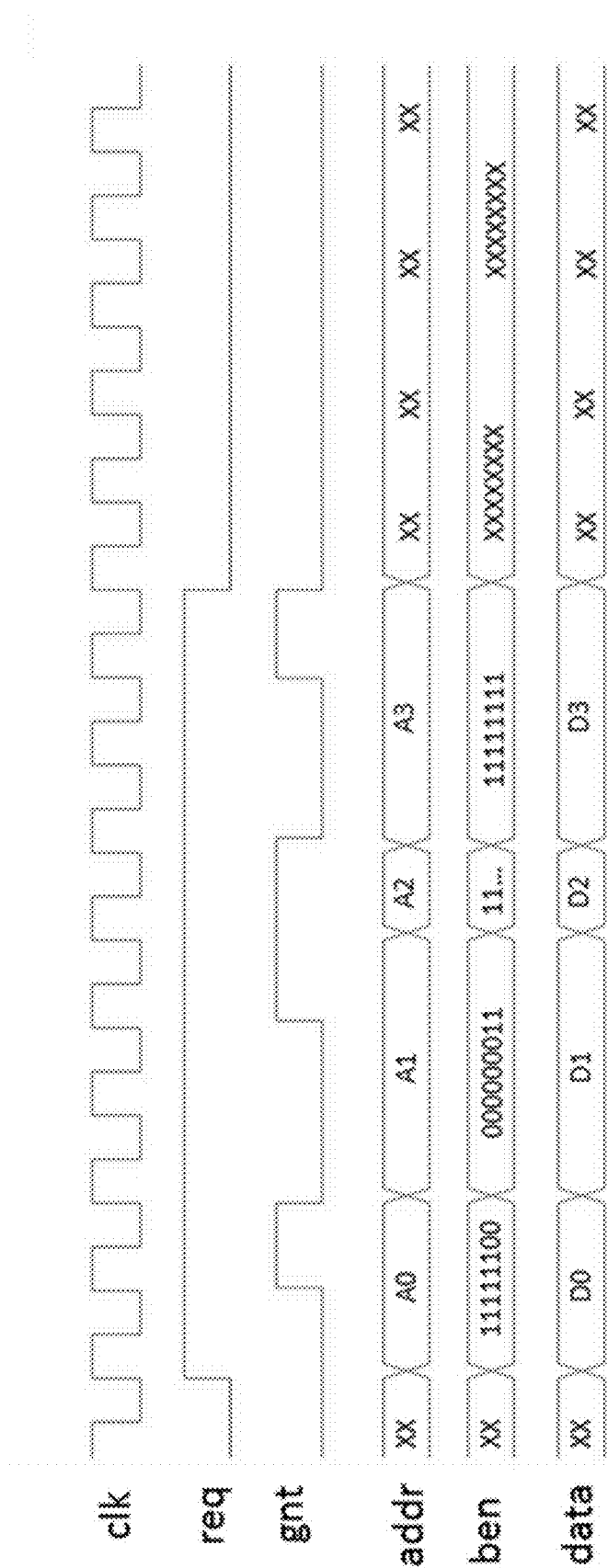
FIG. 24 illustrates a write operation using an AMC in accordance with some embodiments.

FIG. 24 illustrates a write operation using an AMC 1806 in accordance with some embodiments. In the timing diagram the transfer of 4 data words via the AMC to the CMX is shown. A request is issued by the AMC client and on the following rising edge of the clock (clk) the grant signal (gnt) goes high transferring the data-word D0 associated with address A0 via the AMC. The gnt signal then goes low for once clock cycle and on the following rising edge of clk gnt goes high for 2 clock cycles allowing D1 and D2 to addresses A1 and A2 respectively before gnt goes low again. On the next rising clk edge gnt goes high again, allowing data word D3 to be transferred to address A3, whereupon req and gnt go low on the next rising edge of clk awaiting the next read/write request.

The Streaming Image Processing Pipeline (SIPP) software framework used in conjunction with the exemplary arrangement of FIG. 12 provides a flexible approach to implementing image processing pipelines using CMX memory 412 for scan-line buffers, frame tiles (subsections of frames) or indeed entire frames at high resolution with the adjunct of an external DRAM die in package wire-bonded to a substrate to which the image/video processing die is attached. The SIPP framework takes care of complexities such as handling image borders (replication of pixels) and circular line buffer management making the implementation of ISP (Image Signal-Processing) functions in software (on the processor) simpler and more generic.

Figure 25:
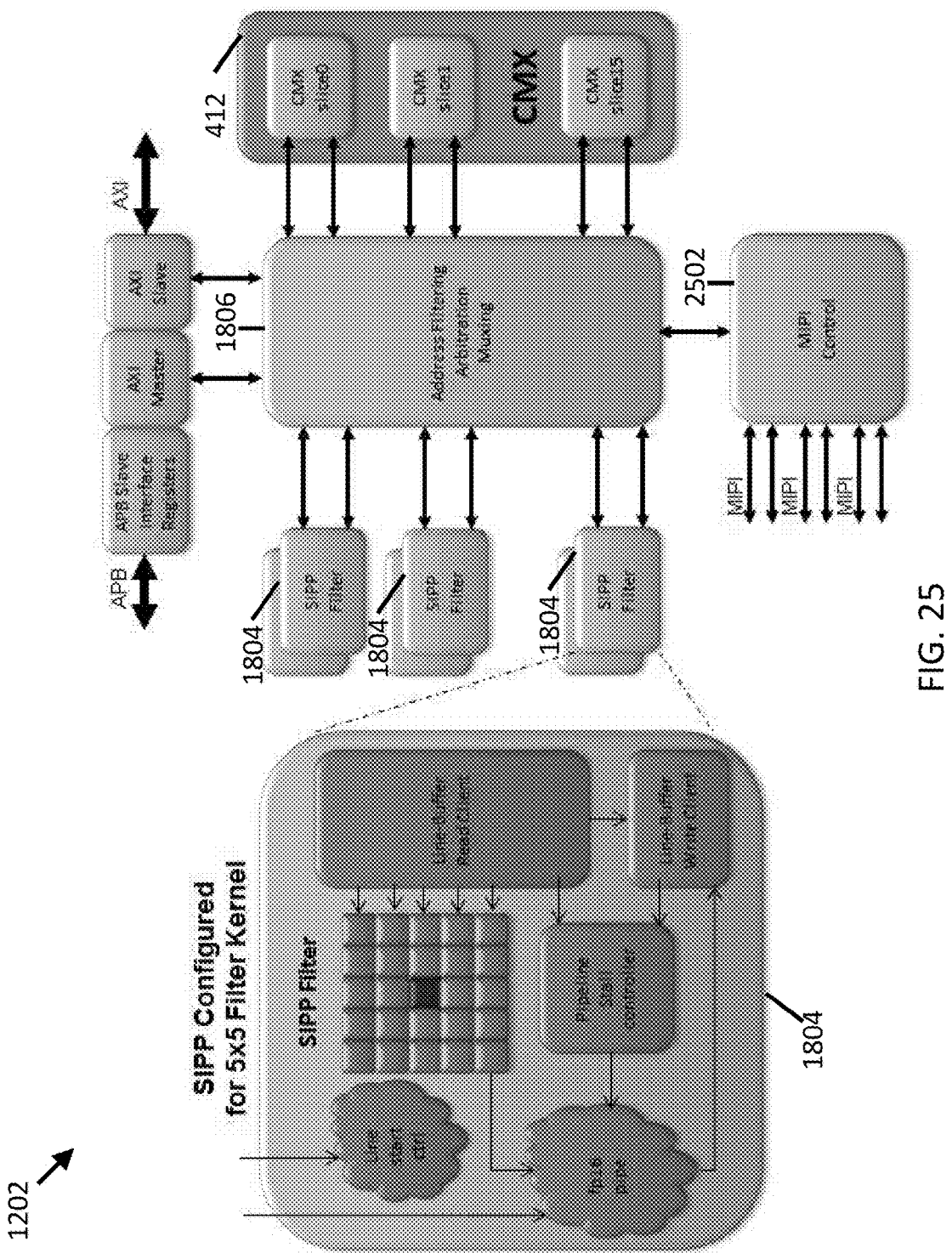
FIG. 25 illustrates the parallel processing device in accordance with some embodiments.

FIG. 25 illustrates the parallel processing device 400 in accordance with some embodiments. The parallel processing device 400 can include a memory subsystem (CMX) 412, a plurality of filter accelerators 1804, and a bus structure 1806 for arbitrating access to the memory subsystem 412. The memory subsystem (CMX) 412 is constructed to allow a plurality of processing elements 402 to access, in parallel, data and program code memory without stalling. These processing elements 402 can include, for example, SHAVE (Streaming Hybrid Architecture Vector Engine) processors, suitably VLIW (Very Long Instruction Word) processors, parallel access to data and program code memory without stalling, or a filter accelerator. Additionally, the memory subsystem (CMX) 412 can make provision for a host processor (not shown) to access the CMX memory subsystem 412 via a parallel bus such as AXI (not shown). In some embodiments, each processing element 402 can read/write up to 128-bits per cycle through its LSU ports and read up to 128 bit program code per cycle through its instruction port. In addition to ISI and AMC interfaces for processors and filter accelerators, respectively, the CMX 412 provides simultaneous read/write access to memory through the AHB and AXI bus interfaces. The AHB and AXI are standard ARM parallel interface busses which allow a processor, memory and peripherals to be connected using a shared bus infrastructure 1806. The CMX memory subsystem 412 can be configured to handle a peak of 18×128-bit memory accesses per cycle.

The Accelerators 1804 include a collection of hardware image processing filters that can be used in the SIPP software framework 1200. The Accelerators 1804 can enable some of the most computationally intensive functionality to be offloaded from the processing elements 1802. The diagram shows how a plurality of filter accelerators 1804 may be connected to the AMC 1804 which performs Address filtering, arbitration and multiplexing. Also connected to the AMC 1804 may be multiple MIPI camera serial interfaces 2502, in the preferred implementation a total of 12 MIPI serial lanes are connected in 6 groups of 2 lanes. The AMC 1804 also is connected to AXI and APB interfaces to allow the 2 system RISC processors in the reference implementation to access the CMX memory via the AMC. The final element of the diagram is the CMX 412 which the AMC 1804 arbitrates access to, allowing simultaneous access by multiple hardware filter accelerators 1804 to the physical RAM instances in the CMX memory 412. A reference filter accelerator 1804 is also shown, in this case a 5×5 2D filter kernel, which contains an fp16 (IEEE754-like 16-bit floating-point format) arithmetic pipeline, an associated pipeline stall controller, line buffer read client to store a line of input to the fp16 pipeline, a line start control input and line buffer write client to store output from the fp16 pipeline. To allow the Accelerators to fit within the SIPP framework they require high bandwidth access to CMX memory, this is provided by the Accelerator Memory Controller (AMC).

In some embodiments, the CMX memory subsystem 412 can be split into 128 kB blocks or slices associated with their neighbouring processing element 402 for high-speed, low power access. Within a slice, the memory is organized as a number of smaller tiles, for example 3×32 kB, 1×16 kB and 2×8 KB independent SRAM blocks. The physical RAM size can be chosen as a trade-off of area utilization and configuration flexibility. Any processing element 402 can access physical RAM anywhere in the memory subsystem (CMX) 412 with the same latency (3 cycles) but access outside of a local processor slice is limited in bandwidth and will consume more power than an access a local slice. In general, to decrease the power consumption and to increase performance, a processing element 402 can store data locally in a dedicate memory slice.

In some embodiments, each physical RAM can be 64-bit wide. If more than one processing element 402 attempts to access a single physical RAM, a clash can occur resulting in a processor stall. The CMX will automatically arbitrate between port clashes and ensure that no data is lost. For every port clash, a processing element 402 is stalled for a cycle resulting in lower throughput. With careful data layout (by the programmer) within the CMX 412, port clashes can be avoided and processor cycles better utilized.

In some embodiments, a plurality of processors are provided with accelerators and CMX memory.

It can be seen from the image-processing HW architecture shown in FIG. 25 that each filter accelerator 1804 can include at least one AMC read and/or write client interface to access CMX memory 412. The number of read/write client interfaces on the AMC 1806 is suitably configurable. The AMC 1806 can include a pair of 64 bit ports into each slice of CMX memory 412. The AMC 1806 routes requests from its clients to the appropriate CMX slice 412 (by partial address decode). Simultaneous requests to the same slice from different clients can be arbitrated in round-robin manner Read data returned from CMX 412 is routed back to the requesting AMC read clients.

AMC clients (accelerators) 1804 present a full 32 bit address to the AMC 1806. Accesses from clients which do not map to CMX memory space are forwarded to the AMC's AXI master. Simultaneous accesses (outside CMX memory space) from different clients are arbitrated in a round-robin manner.

The AMC 1806 is not limited to providing CMX 412 access to filter accelerators 1804; any hardware accelerator or 3rd party elements may use the AMC 1806 to access CMX and the wider memory space of the platform if its memory interfaces are suitably adapted to the read/write client interfaces on the AMC.

The hardware image processing pipeline (SIPP) can include the filter accelerators 1804, an arbitration block 1806, MIPI control 2502, APB and AXI interfaces and connections to the CMX multiport memory 412 as well as an exemplary hardware 5×5 filter kernel. This arrangement allows a plurality of processors 1802 and hardware filter accelerators 1804 for image-processing applications to share a memory subsystem 412 composed of a plurality of single-ported RAM (Random Access Memory) physical blocks.

The use of single-ported memories increases the power and area efficiency of the memory subsystem but limits the bandwidth. The proposed arrangement allows these RAM blocks to behave as a virtual multi-ported memory subsystem capable of servicing multiple simultaneous read and write requests from multiple sources (processors and hardware blocks) by using multiple physical RAM instances and providing arbitrated access to them to service multiple sources.

The use of an Application Programming Interface (API), and data partitioning at the application level is important in order to ensure that contention for physical RAM blocks between processors and filter accelerators, or processors among themselves is reduced and hence the data bandwidth delivered to processors and hardware is increased for a given memory subsystem configuration.

Figure 26:
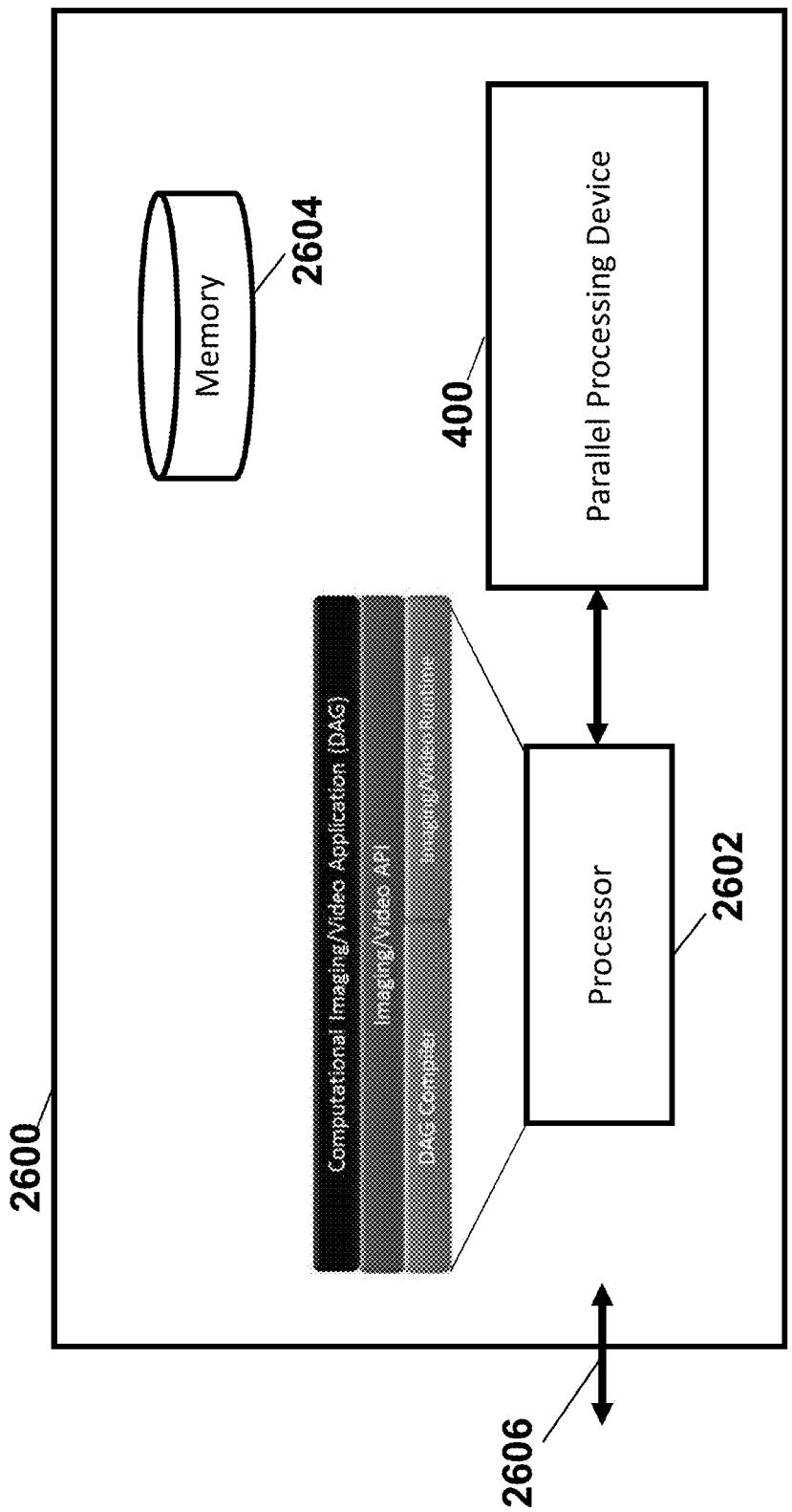
FIG. 26 illustrates an electronic device that includes a parallel processing device in accordance with some embodiments.

In some embodiments, the parallel processing device 400 can reside in an electronic device. FIG. 26 illustrates an electronic device that includes a parallel processing device in accordance with some embodiments. The electronic device 2600 can include a processor 2602, memory 2604, one or more interfaces 2606, and a parallel processing device 400.

The electronic device 2600 can have memory 2604 such as a computer readable medium, flash memory, a magnetic disk drive, an optical drive, a programmable read-only memory (PROM), and/or a read-only memory (ROM). The electronic device 2600 can be configured with one or more processors 2602 that process instructions and run software that may be stored in memory 2604. The processor 2602 can also communicate with the memory 2604 and interfaces 2606 to communicate with other devices. The processor 2602 can be any applicable processor such as a system-on-a-chip that combines a CPU, an application processor, and flash memory, or a reduced instruction set computing (RISC) processor.

In some embodiments, the compiler 1208 and the runtime scheduler 1210 can be implemented in software stored in memory 2604, and operate on the processor 2602. The memory 2604 can be a non-transitory computer readable medium, flash memory, a magnetic disk drive, an optical drive, a programmable read-only memory (PROM), a read-only memory (ROM), or any other memory or combination of memories. The software can run on a processor capable of executing computer instructions or computer code. The processor might also be implemented in hardware using an application specific integrated circuit (ASIC), programmable logic array (PLA), field programmable gate array (FPGA), or any other integrated circuit.

In some embodiments, the compiler 1208 can be implemented in a separate computing device in communication with the electronic device 2600 over the interface 2606. For example, the compiler 1208 can operate in a server in communication with the electronic device 2600.

The interfaces 2606 can be implemented in hardware or software. The interfaces 2606 can be used to receive both data and control information from the network as well as local sources, such as a remote control to a television. The electronic device can also provide a variety of user interfaces such as a keyboard, a touch screen, a trackball, a touch pad, and/or a mouse. The electronic device may also include speakers and a display device in some embodiments.

In some embodiments, a processing element in the parallel processing device 400 can include an integrated chip capable of executing computer instructions or computer code. The processor might also be implemented in hardware using an application specific integrated circuit (ASIC), programmable logic array (PLA), field programmable gate array (FPGA), or any other integrated circuit.

In some embodiments, the parallel processing device 400 can be implemented as a system on chip (SOC). In other embodiments, one or more blocks in the parallel processing device can be implemented as a separate chip, and the parallel processing device can be packaged in a system in package (SIP). In some embodiments, the parallel processing device 400 can be used for data processing applications. The data processing applications can include image processing applications and/or video processing applications. The image processing applications can include an image processing process, including an image filtering operation; the video processing applications can include a video decoding operation, a video encoding operation, a video analysis operation for detecting motion or objects in videos. Additional applications of the present invention include machine learning and classification based on sequence of images, objects or video and augmented reality applications including those where a gaming application extracts geometry from multiple camera views including depth enabled cameras, and extracts features from the multiple views from which wireframe geometry (for instance via a point-cloud) can be extracted for subsequent vertex shading by a GPU.

The electronic device 2600 can include a mobile device, such as a cellular phone. The mobile device can communicate with a plurality of radio access networks using a plurality of access technologies and with wired communications networks. The mobile device can be a smart phone offering advanced capabilities such as word processing, web browsing, gaming, e-book capabilities, an operating system, and a full keyboard. The mobile device may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The mobile device may have the capability to run applications or communicate with applications that are provided by servers in the communications network. The mobile device can receive updates and other information from these applications on the network.

The electronic device 2600 can also encompasses many other devices such as televisions (TVs), video projectors, set-top boxes or set-top units, digital video recorders (DVR), computers, netbooks, laptops, tablet computers, and any other audio/visual equipment that can communicate with a network. The electronic device can also keep global positioning coordinates, profile information, or other location information in its stack or memory.

It will be appreciated that whilst several different arrangements have been described herein, that the features of each may be advantageously combined together in a variety of forms to achieve advantage.

In the foregoing specification, the application has been described with reference to specific examples. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A parallel processing device to access memory, the parallel processing device comprising:
   a first processing element and a second processing element;
   an interconnect system to:
      couple a first address encoder with the first processing element;

couple a second address encoder with the second processing element; and route memory access attempts from the first and second processing elements to the respective first and second address encoders; and a centralized arbitration device to:

couple the first and second address encoders to a first clash detector, the first clash detector associated with a first random access memory (RAM) tile;

couple the first and second address encoders to a second clash detector, the second clash detector associated with a second RAM tile;

determine a count of output values of the respective first and second address encoders via the respective first and second clash detectors; and detect a clash of the memory access attempts of the first and second RAM tiles based on the count of output values.

2. The parallel processing device as defined in claim 1, wherein the respective first and second address encoders are to determine a respective target address of the respective memory access attempts.

3. The parallel processing device as defined in claim 1, wherein the first and second address encoders are to generate the count of output values when a target address satisfies a range threshold.

4. The parallel processing device as defined in claim 1, wherein the first clash detector is to send a halt signal to one of the first processing element or the second processing element in response to detecting the clash.

5. The parallel processing device as defined in claim 1, further including:

a first range compare block associated with the first RAM tile;

a second range compare block associated with the second RAM tile; and an OR gate communicatively connected to outputs of the first and second range compare blocks, an output of the OR gate communicatively connected to one of the first or second processing elements to send a halt signal in response to the clash.

6. The parallel processing device as defined in claim 1, wherein the first clash detector is to calculate the count of output values from the first and second address encoders to identify the clash associated with the first RAM tile.

7. The parallel processing device as defined in claim 6, wherein the centralized arbitration device is to report a clash condition when the count of output values is greater than 1.

8. The parallel processing device as defined in claim 1, further including the centralized arbitration device to retrieve a client request vector associated with the first and second processing elements, the arbitration block to determine memory access attempts based on bit positions of the client request vector.

9. The parallel processing device as defined in claim 8, wherein the client request vector is associated with memory access attempts to one of a first or second memory slice.

10. The parallel processing device as defined in claim 9, further including a port winner selection block to determine which one of the memory access attempts to assign based on a priority vector.

11. The parallel processing device as defined in claim 9, further including a winner detection block to, in response to an access attempt for the same one of the first and second memory slice, select a winning one of the first or second memory slice associated with a relatively highest input vector rank to avoid resource over allocation.

12. A parallel processing system to access memory, the parallel processing system comprising:

a first processing element and a second processing element;

means for processing element coupling, the processing element coupling means to couple a first address encoder with the first processing element, and couple a second address encoder with the second processing element;

means for routing memory access attempts from the first and second processing elements to the respective first and second address encoders;

means for random access memory (RAM) element coupling, the RAM element coupling means to:

couple the first and second address encoders to a first clash detector, the first clash detector associated with a first RAM tile;

couple the first and second address encoders to a second clash detector, the second clash detector associated with a second RAM tile; and determine a count of output values of the respective first and second address encoders via the respective first and second clash detectors; and means for detecting a clash of the memory access attempts of the first and second RAM tiles based on the count of output values.

13. The parallel processing system as defined in claim 12, wherein the clash detecting means is to send a halt signal to one of the first processing element or the second processing element in response to the clash.

14. The parallel processing system as defined in claim 12, further including means for identifying a respective target address of the respective memory access attempts from the first and second address encoders.

15. The parallel processing system as defined in claim 14, wherein the identifying means is to generate an authorization bit in response to detecting the target address that satisfies a range threshold.

16. The parallel processing system as defined in claim 15, wherein the identifying means is to authorize one of the first or second processing elements and a respective one of the first or second RAM tiles when the target address satisfies the range threshold.

17. The parallel processing system as defined in claim 12, wherein the clash detecting means is to calculate the count of output values from the first and second address encoders to identify the clash.

18. The parallel processing system as defined in claim 17, wherein the clash detecting means is to report a clash condition when the count of output vales is greater than 1.

19. A computer readable storage disk or storage device comprising instructions that, when executed, cause one or more processor to, at least:

couple a first address encoder with a first processing element;

couple a second address encoder with a second processing element;

route memory access attempts from the first and second processing elements to the respective first and second address encoders;

couple the first and second address encoders to a first clash detector, the first clash detector associated with a first random access memory (RAM) tile;

couple the first and second address encoders to a second clash detector, the second clash detector associated with a second RAM tile;

determine a count of output values of the respective first and second address encoders via the respective first and second clash detectors; and detect a clash of the memory access attempts of first and second RAM tiles based on output values of the respective first and second encoders based on the count of output values.

20. The computer readable storage disk or storage device as defined in claim 19, wherein the instructions, when executed, further cause the one or more processor to send a halt signal to one of the first processing element or the second processing element in response to detecting the clash.

21. The computer readable storage disk or storage device as defined in claim 19, wherein the instructions, when executed, further cause the one or more processor to:

associate a first range compare block with the first RAM tile;

associate a second range compare block with the second RAM tile; and evaluate an OR gate output communicatively connected to outputs of the first and second range compare blocks to send a halt signal in response to the clash.

22. The computer readable storage disk or storage device as defined in claim 19, wherein the instructions, when executed, further cause the one or more processor to identify a respective target address of the memory access attempts from the respective first and second address encoders.

23. The computer readable storage disk or storage device as defined in claim 22, wherein the instructions, when executed, further cause the one or more processor to generate the count of output values by at least one of the first and second address encoders in response to detecting a target address that satisfies a range threshold.

24. The computer readable storage disk or storage device as defined in claim 23, wherein the instructions, when executed, further cause the one or more processor to authorize one of the first or second processing elements and a respective one of the first or second RAM tiles when the target address satisfies the range threshold.

25. The computer readable storage disk or storage device as defined in claim 19, wherein the instructions, when executed, further cause the one or more processor to calculate the count of output values from the first and second address encoders to identify the clash associated with the first RAM tile.

26. The computer readable storage disk or storage device as defined in claim 25, wherein the instructions, when executed, further cause the one or more processor to report a clash condition when the count of output values is greater than 1.

27. The computer readable storage disk or storage device as defined in claim 19, wherein the instructions, when executed, further cause the one or more processor to retrieve a client request vector associated with the first and second processing elements to determine memory access attempts based on bit positions of the client request vector.

28. The computer readable storage disk or storage device as defined in claim 27, wherein the instructions, when executed, further cause the one or more processor to associate the client request vector with memory access attempts to one of a first or second memory slice.

29. The computer readable storage disk or storage device as defined in claim 28, wherein the instructions, when executed, further cause the one or more processor to determine which one of the memory access attempts to assign based on a priority vector.

30. The computer readable storage disk or storage device as defined in claim 28, wherein the instructions, when executed, further cause the one or more processor to, in response to an access attempt for the same one of the first and second memory slice, by selecting a winning one of the first or second memory slice associated with a relatively highest input vector rank to avoid resource over allocation.

* * * * *